US012030252B2

(12) United States Patent
Stranberg et al.

(10) Patent No.: US 12,030,252 B2
(45) Date of Patent: Jul. 9, 2024

(54) ADDITIVE MANUFACTURING SYSTEM

(71) Applicant: Continuous Composites Inc., Coeur d'Alene, ID (US)

(72) Inventors: Nathan Andrew Stranberg, Post Falls, ID (US); Andrew John Overby, Coeur d'Alene, ID (US); Andrew Michael Stulc, Harrison, NJ (US); Stephen Tyler Wilson, Coeur D'Alene, ID (US); Ryan C. Stocket, Spokane, WA (US); Brock Adam Jahner, Kalispell, MT (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 17/657,995

(22) Filed: Apr. 5, 2022

(65) Prior Publication Data

US 2022/0339866 A1    Oct. 27, 2022

Related U.S. Application Data

(60) Provisional application No. 63/180,633, filed on Apr. 27, 2021.

(51) Int. Cl.
*B29C 64/118*    (2017.01)
*B29C 64/165*    (2017.01)
(Continued)

(52) U.S. Cl.
CPC .......... *B29C 64/336* (2017.08); *B29C 64/118* (2017.08); *B29C 64/165* (2017.08);
(Continued)

(58) Field of Classification Search
CPC ... B29C 64/336; B29C 64/379; B29C 64/357; B29C 64/118; B29C 64/245;
(Continued)

(56) References Cited

U.S. PATENT DOCUMENTS 3,286,305 A    11/1966 Seckel
3,809,514 A    5/1974 Nunez
(Continued)

FOREIGN PATENT DOCUMENTS

CN    203110525 U  *  8/2013
CN    109551762 A  *  4/2019  ........... B29C 64/165
(Continued)

OTHER PUBLICATIONS

Variohm Eurosensor, accessed Mar. 10, 2023, https://www.variohm.com/products/rotary-position-sensors (Year: 2020).*
(Continued)

*Primary Examiner* — Alison L Hindenlang
*Assistant Examiner* — Erica Hartsell Funk
(74) *Attorney, Agent, or Firm* — Ryan C. Stockett

(57) ABSTRACT

A print head is disclosed for use in additively manufacturing an object. The print head may have a housing, and a wetting module configured to wet a reinforcement with a liquid matrix. The print head may also include a matrix supply configured to hold a quantity of the liquid matrix and supply the liquid matrix to the wetting module.

9 Claims, 25 Drawing Sheets

(51) Int. Cl.

| | |
|---|---|
| *B29C 64/209* | (2017.01) |
| *B29C 64/241* | (2017.01) |
| *B29C 64/245* | (2017.01) |
| *B29C 64/295* | (2017.01) |
| *B29C 64/336* | (2017.01) |
| *B29C 64/357* | (2017.01) |
| *B29C 64/379* | (2017.01) |
| *B29C 64/393* | (2017.01) |
| *B33Y 10/00* | (2015.01) |
| *B33Y 30/00* | (2015.01) |
| *B29C 64/227* | (2017.01) |
| *B33Y 40/10* | (2020.01) |
| *B33Y 70/10* | (2020.01) |

(52) U.S. Cl.
CPC .......... *B29C 64/209* (2017.08); *B29C 64/241* (2017.08); *B29C 64/245* (2017.08); *B29C 64/295* (2017.08); *B29C 64/357* (2017.08); *B29C 64/379* (2017.08); *B29C 64/393* (2017.08); *B33Y 10/00* (2014.12); *B33Y 30/00* (2014.12); *B29C 64/227* (2017.08); *B33Y 40/10* (2020.01); *B33Y 70/10* (2020.01)

(58) Field of Classification Search
CPC ... B29C 64/295; B29C 64/209; B29C 64/393; B29C 64/241; B29C 64/165; B41J 2/17503; B41J 2/1754; B41J 2/17556; B41J 2/17573
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,121,329 A | 6/1992 | Crump | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,511,543 B2 | 12/2016 | Tyler | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,254,499 B1* | 4/2019 | Cohen | H01R 4/024 |
| 10,315,355 B2 | 6/2019 | Tyler | |
| 10,315,356 B2 | 6/2019 | Tyler | |
| 10,449,711 B2 | 10/2019 | Tyler | |
| 10,603,836 B2 | 3/2020 | Tyler | |
| 10,744,707 B2 | 8/2020 | Tyler | |
| 10,744,708 B2 | 8/2020 | Tyler | |
| 10,759,109 B2 | 9/2020 | Tyler | |
| 10,953,605 B2* | 3/2021 | Tibbits | B29C 64/118 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0145650 A1* | 10/2002 | Pan | B41J 2/17566 |
| | | | 347/85 |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2009/0177309 A1* | 7/2009 | Kozlak | B29C 64/321 |
| | | | 264/308 |
| 2009/0229760 A1* | 9/2009 | Hamlyn | B29C 70/384 |
| | | | 156/433 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0161439 A1* | 6/2013 | Beery | B65H 49/36 |
| | | | 242/396.1 |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0136897 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |

(56) References Cited

U.S. PATENT DOCUMENTS

| | | |
|---|---|---|
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065300 A1 | 3/2018 | Tyler et al. |
| 2019/0022935 A1 | 1/2019 | Tooren et al. |
| 2019/0315057 A1 | 10/2019 | Budge et al. |
| 2020/0108554 A1 | 4/2020 | Hambling et al. |
| 2020/0156318 A1 | 5/2020 | Stranberg et al. |
| 2020/0324468 A1 | 10/2020 | Tyler |
| 2020/0391289 A1* | 12/2020 | Weaver ................ B33Y 10/00 |
| 2021/0107221 A1* | 4/2021 | Swier .................... B33Y 40/00 |

FOREIGN PATENT DOCUMENTS

| | | |
|---|---|---|
| DE | 4102257 A1 | 7/1992 |
| EP | 2589481 B1 | 1/2016 |
| EP | 3219474 A1 | 9/2017 |
| GB | 2213793 A | 8/1989 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |
| WO | WO-2019246253 A1 * | 12/2019 ............. B22F 10/85 |

OTHER PUBLICATIONS

Shawn, Seeed Studio, https://www.seeedstudio.com/blog/2019/12/23/distance-sensors-types-and-selection-guide/ (Year: 2019).*

Machine translation of CN109551762A from ESpaceNet accessed Mar. 10, 2023 (Year: 2019).*

Machine translation of Hou, CN203110525U accessed from Espacenet Aug. 10, 2023 (Year: 2013).*

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Erjlan MA, Solid Freeform Fabrication of Continuous Fiber Reinforced Composite Materials, UMI Microform 3016100, Aug. 6, 2001, pp. 1-248, ProQuest Information and Learning, Ann Arbor, Michigan, USA.

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report mailed Sep. 11, 2021 for PCT/US2021/070977 to Continuous Composites Inc. filed on Jul. 27, 2021.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

(56) References Cited

OTHER PUBLICATIONS

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

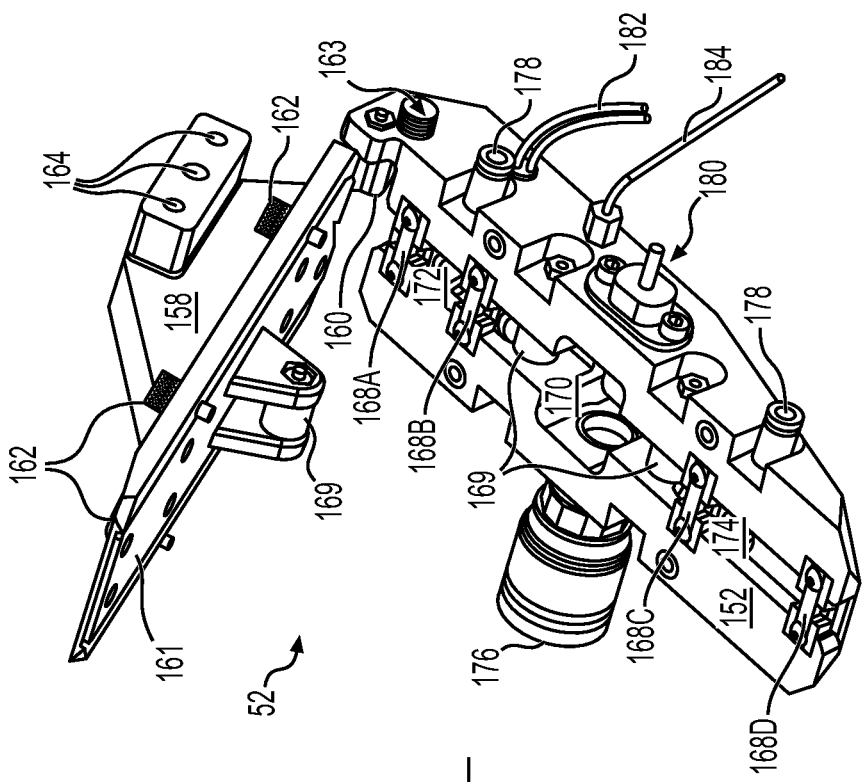
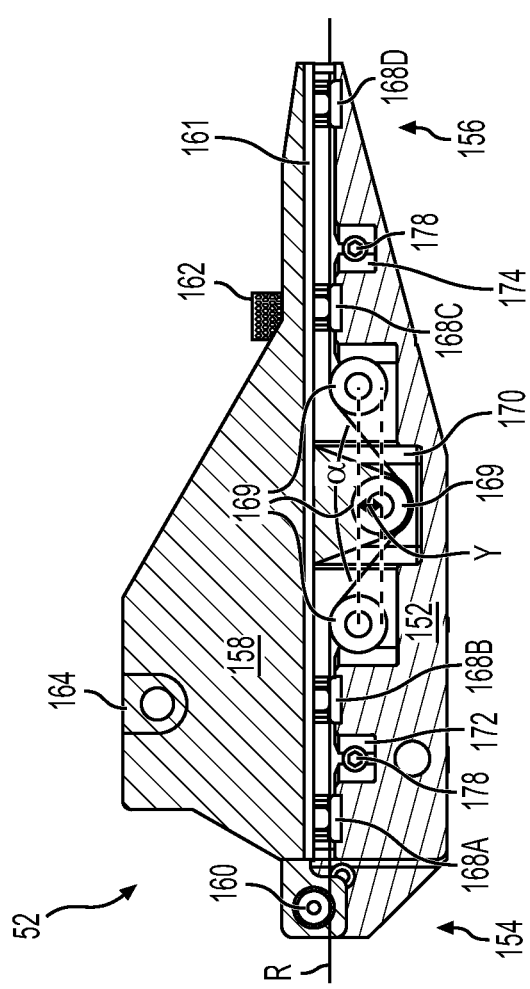

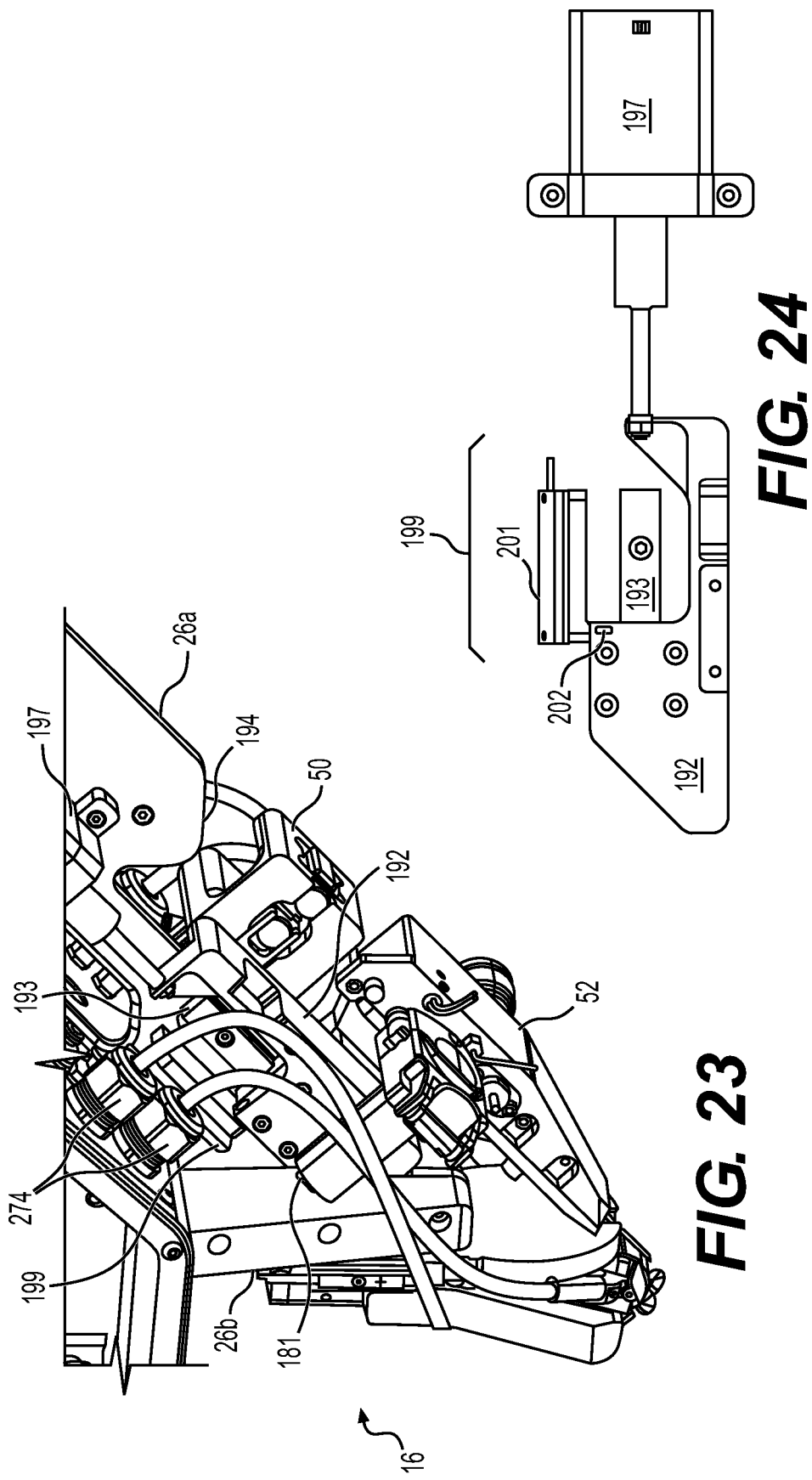

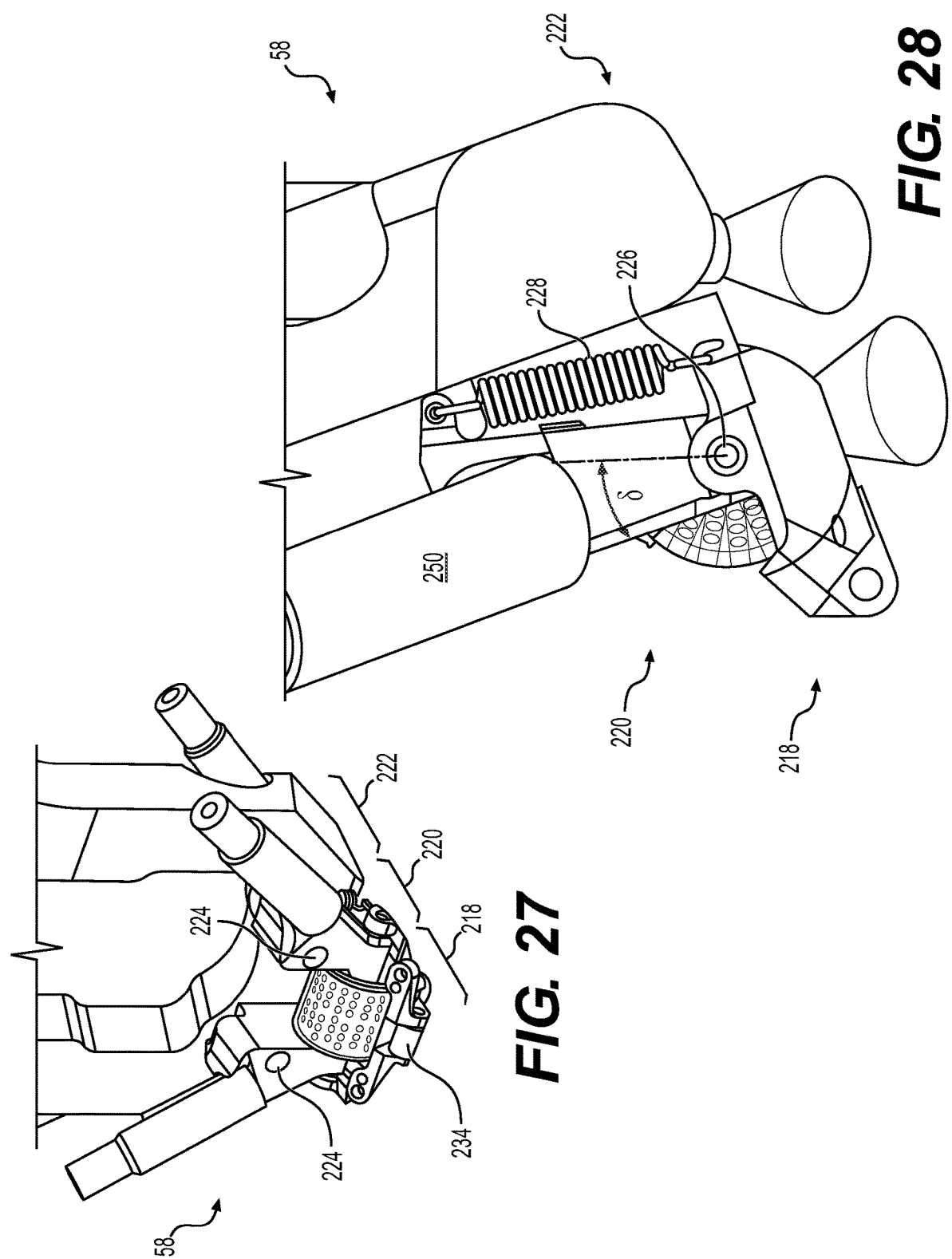

ADDITIVE MANUFACTURING SYSTEM

RELATED APPLICATION

This application is based on and claims the benefit of priority from U.S. Provisional Application No. 63/180,633 that was filed on Apr. 27, 2021, the contents of which are expressly incorporated herein by reference.

TECHNICAL FIELD

The present disclosure relates generally to a manufacturing system and, more particularly, to a system for additively manufacturing a structure.

BACKGROUND

Continuous fiber 3D printing (a.k.a., CF3D®) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., an energy-curable single- or multi-part resin), or a combination of any of these and other known matrixes. Upon exiting the print head, a cure enhancer (e.g., a UV light, a laser, an ultrasonic emitter, a heat source, a catalyst supply, or another energy source.) is activated to initiate, enhance, and/or complete hardening of the matrix. This hardening occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to TYLER on Dec. 6, 2016.

Although CF3D® provides for increased strength, compared to manufacturing processes that do not utilize continuous fiber reinforcement, care must be taken to ensure proper wetting of the fibers with the matrix, proper cutting of the fibers, automated restarting after cutting, proper compaction of the matrix-coated fibers after discharge, and proper curing of the compacting material. An exemplary print head that provides for at least some of these functions is disclosed in U.S. patent application Ser. No. 17/443,421 that was filed on Jul. 26, 2021 ("the '421 application").

While the print head of the '421 application may be functionally adequate for many applications, it may be less than optimal. For example, the print head may lack accuracy and/or longevity in fiber wetting, placement, cutting, compaction, and/or curing that is required for other applications. The disclosed print head and system are directed at addressing one or more of these issues and/or other problems of the prior art.

SUMMARY

In one aspect, the present disclosure is directed to a print head for an additive manufacturing system. The print head may include a housing, and a wetting module configured to wet a reinforcement with a liquid matrix. The print head may also include a matrix supply configured to hold a quantity of the liquid matrix and supply the liquid matrix to the wetting module.

In another aspect, the present disclosure is directed to a method of additively manufacturing an object. The method may include collapsing a cartridge within an onboard supply module to push a liquid matrix into a wetting module. The method may also include passing a reinforcement through the wetting module to wet the reinforcement with the liquid matrix, and discharging the reinforcement and the liquid matrix from the wetting module to form the object.

BRIEF DESCRIPTION OF THE DRAWINGS

FIGS. 15 and 16 are cross-sectional and diagrammatic illustrations, respectively, of an exemplary disclosed wetting module of the print head of FIGS. 2-5;

FIGS. 23 and 24 are diagrammatic illustrations of an exemplary disclosed motion platform that may be used in conjunction with the clamping and wetting modules of FIGS. 13-16;

FIGS. 27 and 28 are diagrammatic illustrations of an exemplary disclosed compacting/curing module of the print head of FIGS. 2-5;

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1% of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
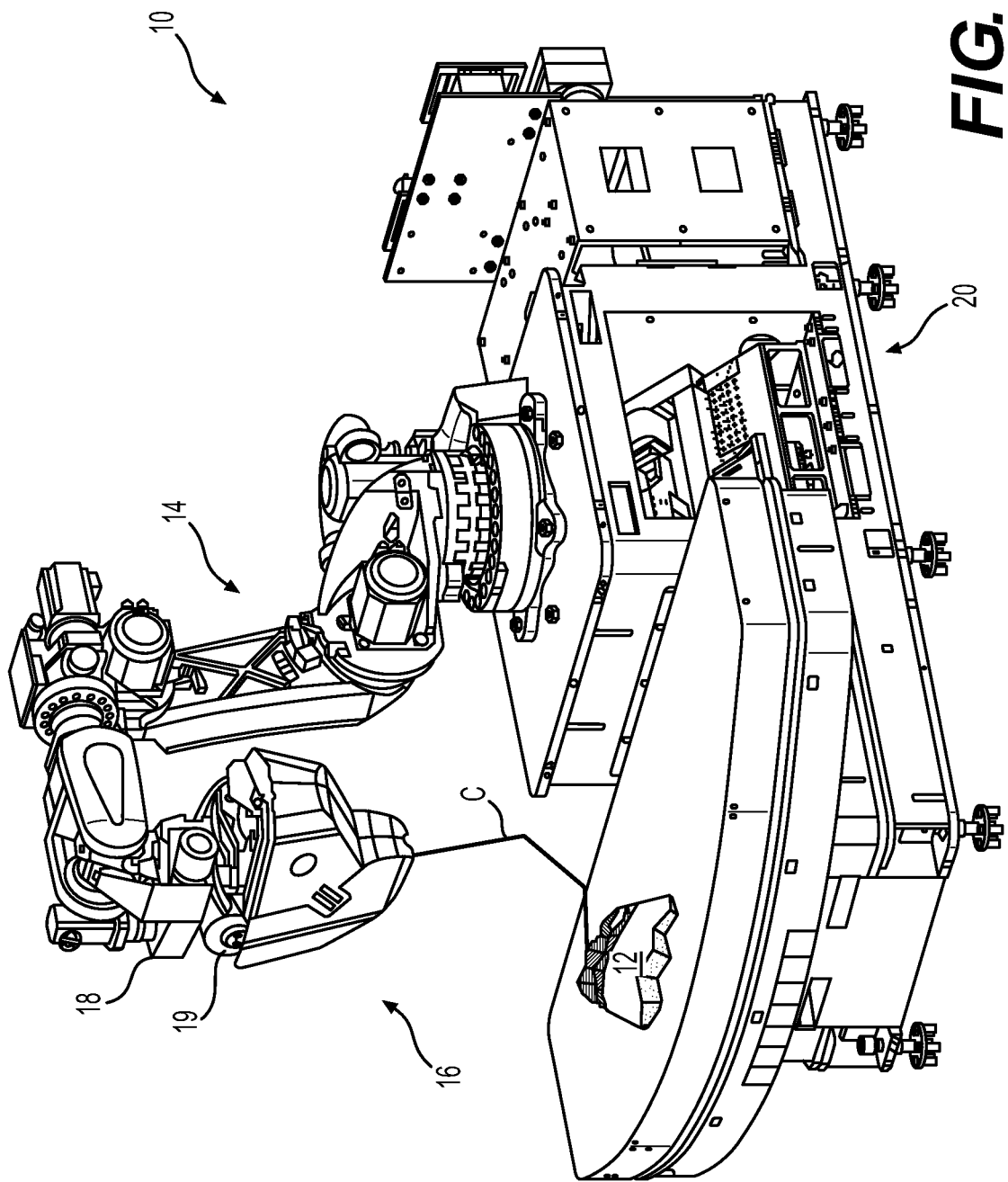
FIG. 1 is a diagrammatic illustration of an exemplary disclosed additive manufacturing system.
Figure 2:
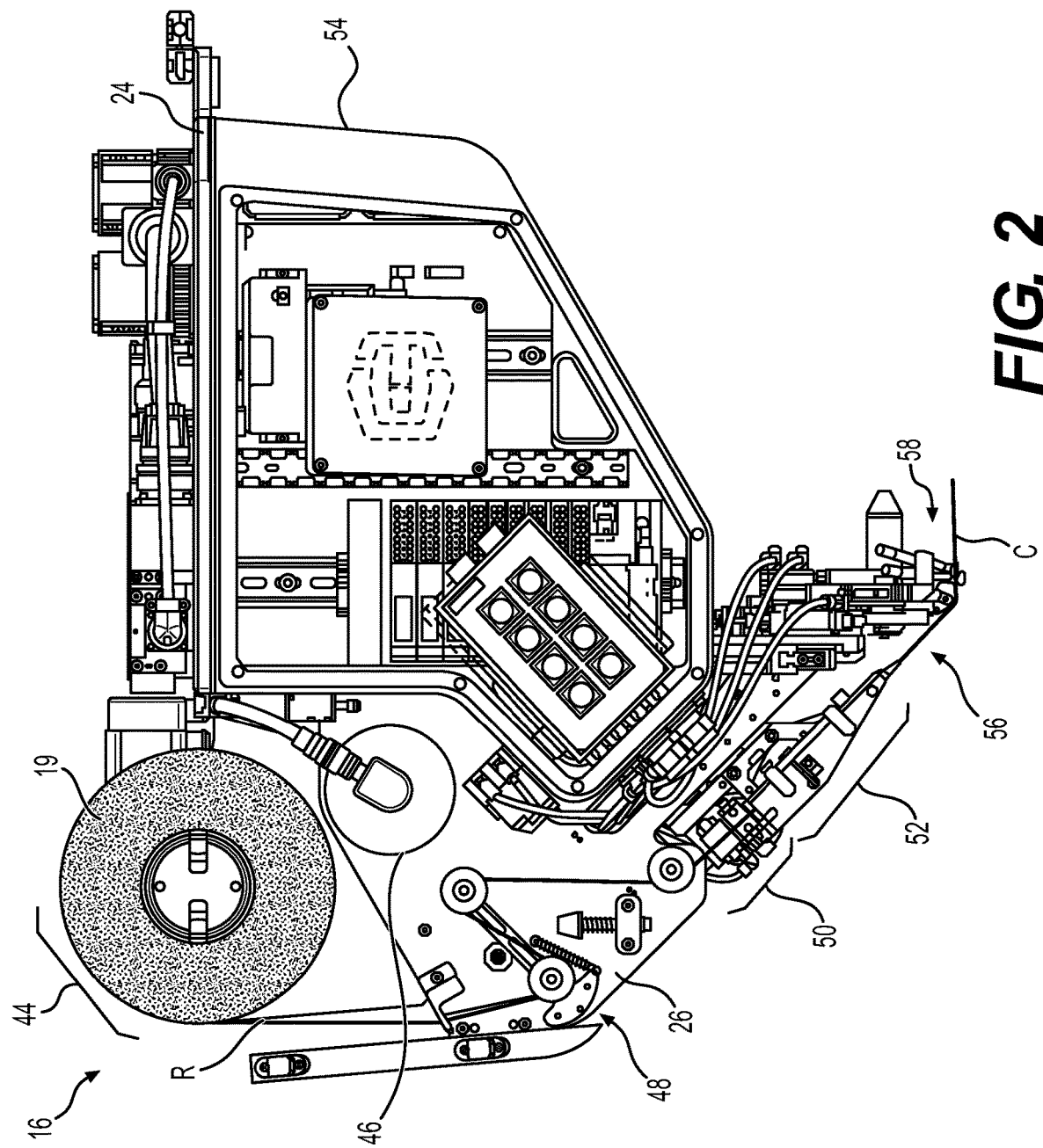
FIGS. 2, 3, 4, and 5 are diagrammatic illustrations of an exemplary disclosed print head that may form a portion of the additive manufacturing system of FIG. 1.
Figure 3:
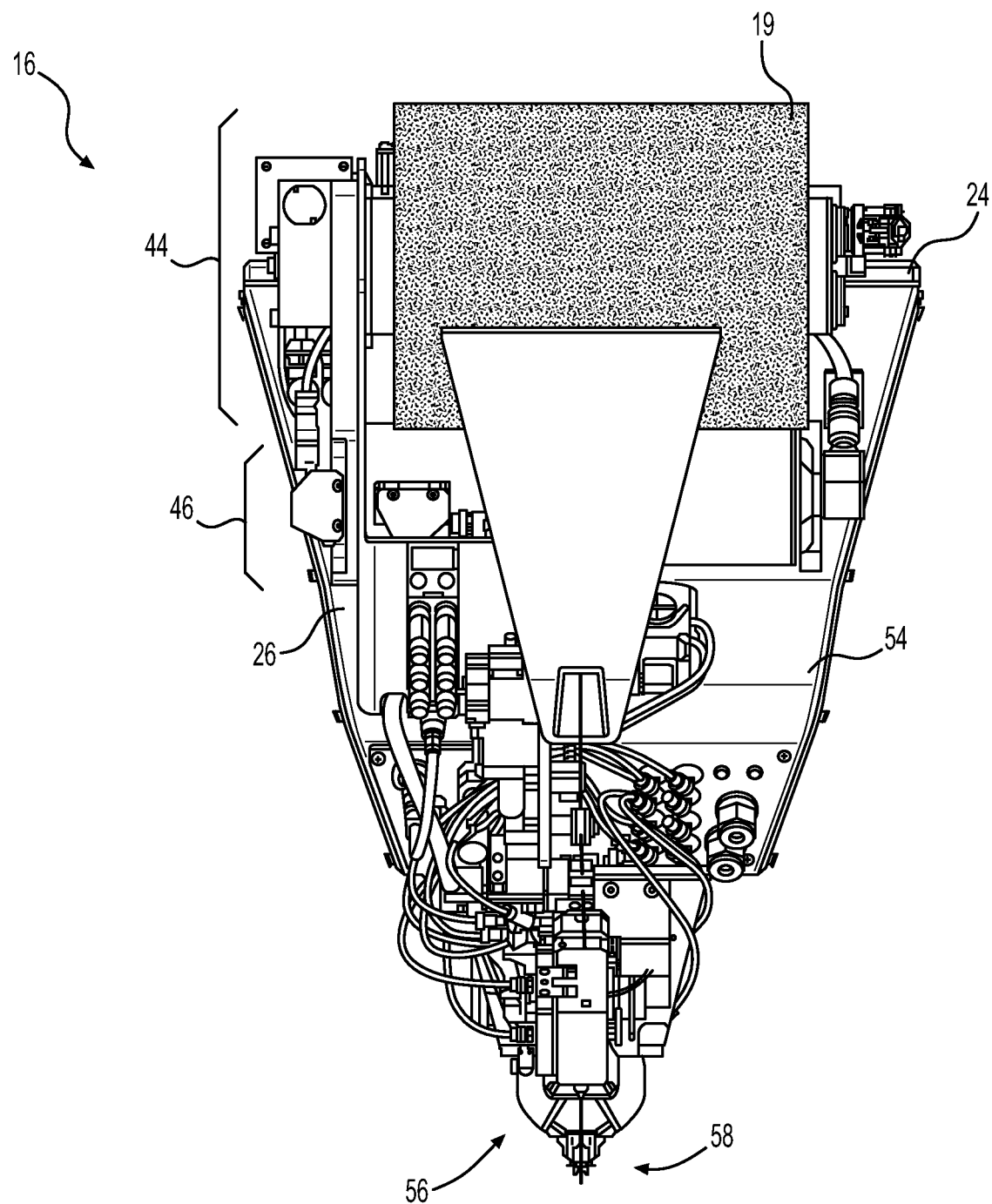
Figure 4:
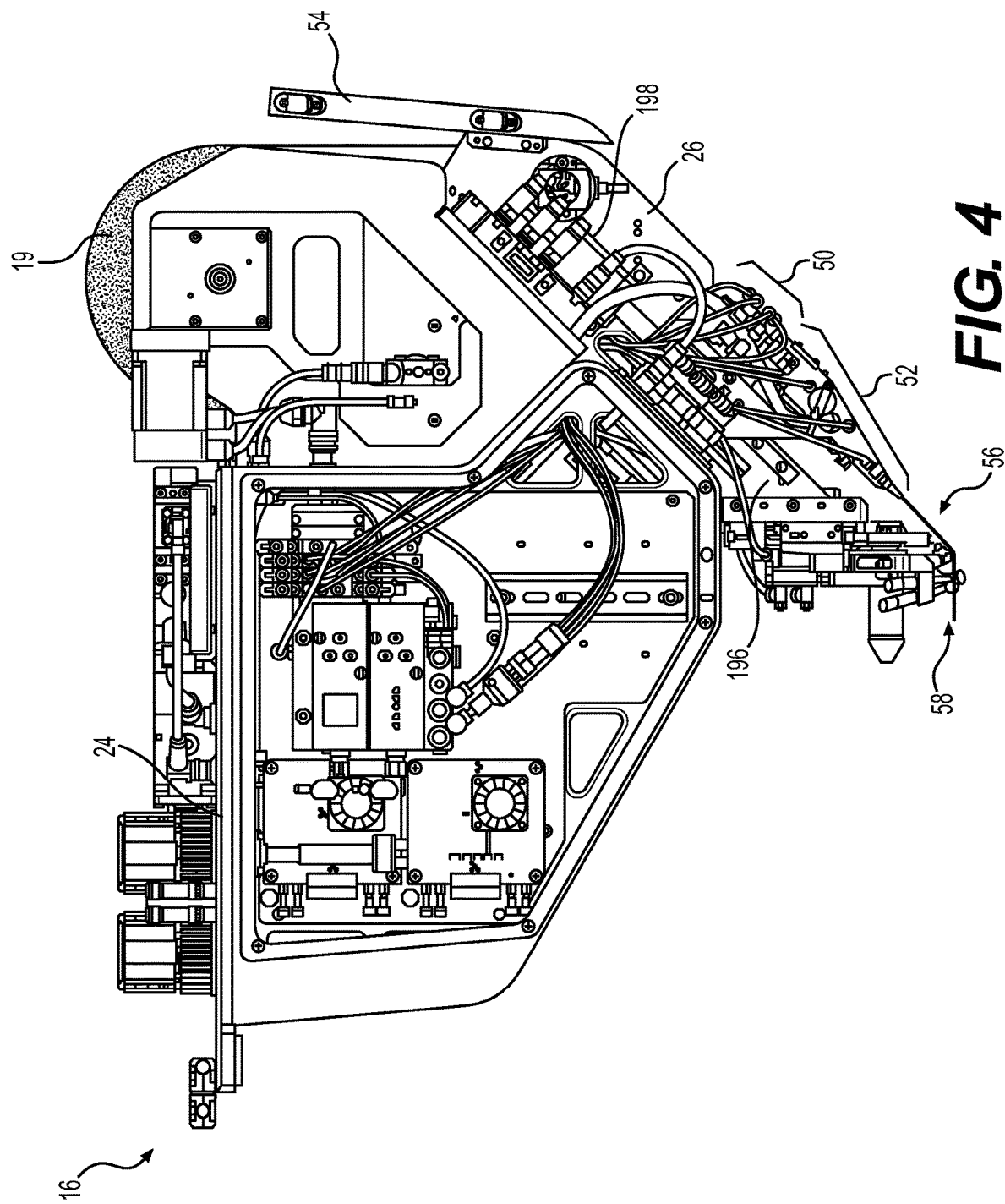
Figure 5:
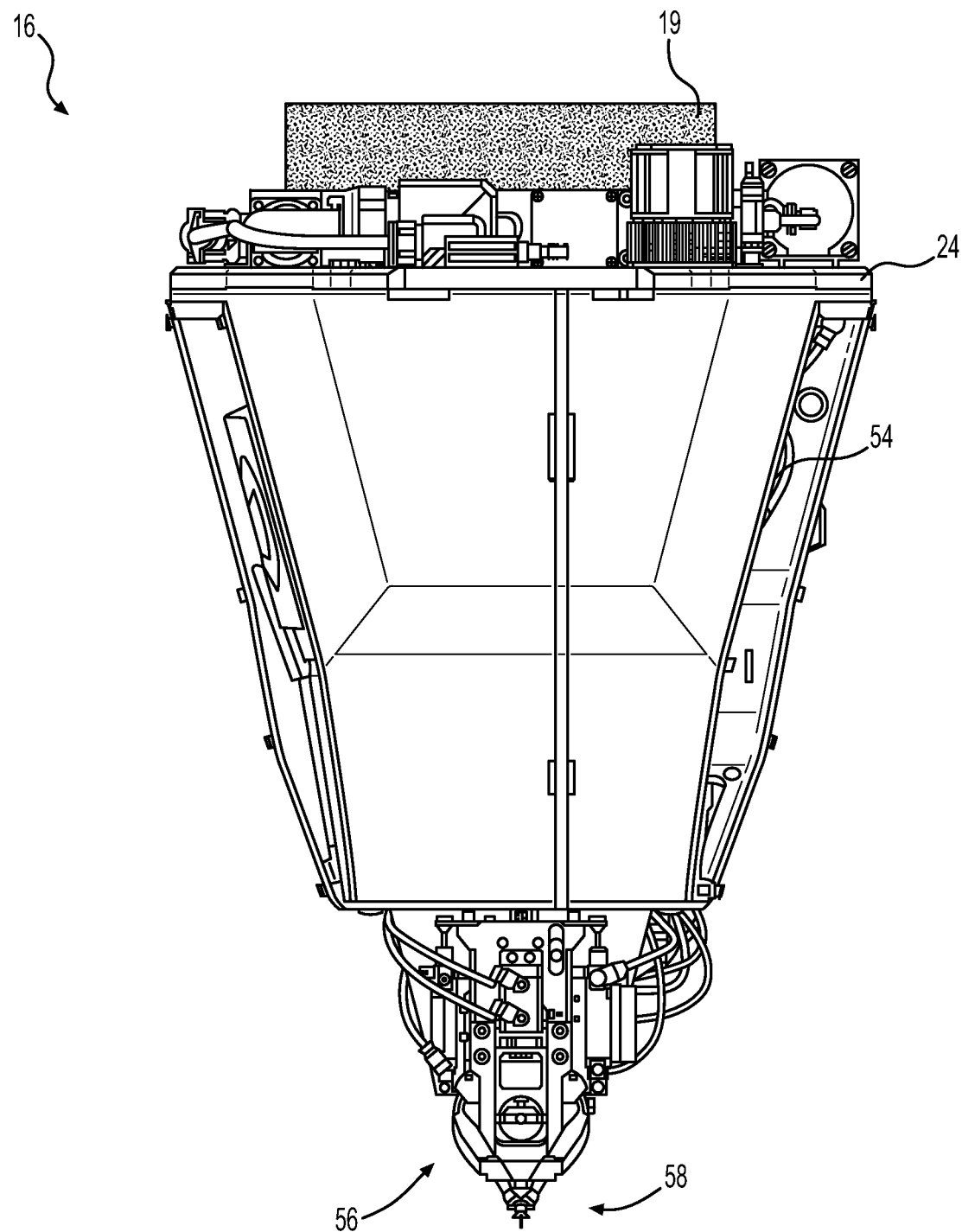

FIG. 1 illustrates an exemplary system 10, which may be used to manufacture a composite structure 12 having any desired shape, size, configuration, and/or material composition. System 10 may include at least a support 14 and a print head ("head") 16. Head 16 may be coupled to and moveable by support 14 during discharge of a composite material (shown as C). In the disclosed embodiment of FIG. 1, support 14 is a robotic arm capable of moving head 16 in multiple directions during fabrication of structure 12. Support 14 may alternatively embody a gantry (e.g., a floor gantry, an overhead or bridge gantry, a single-post gantry, etc.) or a hybrid gantry/arm also capable of moving head 16 in multiple directions during fabrication of structure 12. Although support 14 is shown as being capable of moving head 16 along or about 6 axes, it is contemplated that another type of support 14 capable of moving head 16 (and/or other tooling relative to head 16) in the same or a different manner could also be utilized. In some embodiments, a drive 18 may mechanically join head 16 to support 14 and include components that cooperate to move portions of and/or supply power and/or materials to head 16.

Head 16 may be configured to receive or otherwise contain a matrix that, together with a continuous reinforcement, makes up at least a portion of the composite material C discharging from head 16. The matrix may include any type of material that is curable (e.g., a liquid resin, such as a zero-volatile organic compound resin, a powdered metal, etc.). Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16 and pushed or pulled out of head 16 along with one or more continuous reinforcements. In some instances, the matrix inside head 16 may benefit from being kept cool, dark, and/or pressurized (e.g., to inhibit premature curing or otherwise obtain a desired rate of curing after discharge). In other instances, the matrix may need to be kept warm and/or light for similar reasons. In either situation, head 16 may be specially configured (e.g., insulated, temperature-controlled, shielded, pressurized, etc.) to provide for these needs.

The matrix may be used to coat any number of continuous reinforcements (e.g., separate fibers, tows, rovings, ribbons, socks, sheets and/or tapes of continuous material) and, together with the reinforcements, make up a portion (e.g., a wall, a surface, internal support, etc.) of composite structure 12. The reinforcements may be stored within (e.g., on one or more separate creels 19) or otherwise passed through head 16 (e.g., fed from one or more external spools—not shown). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, fiber particles, nanotubes, etc.) and/or chemical additives may be mixed with the matrix before and/or after the matrix coats the continuous reinforcements.

As will be explained in more detail below, one or more cure enhancers (e.g., a UV light, an ultrasonic emitter, a laser, a heater, a catalyst dispenser, a fan, and/or another source of cure energy) may be mounted proximate (e.g., within, on, or adjacent) head 16 and configured to enhance a cure rate and/or quality of the matrix as it discharges from head 16. The cure enhancer(s) may be controlled to selectively expose portions of structure 12 to the cure energy (e.g., to UV light, electromagnetic radiation, vibrations, heat, a chemical catalyst, pressurized media, etc.) during material discharge and the formation of structure 12. The cure energy may trigger a chemical reaction to occur within the matrix, increase a rate of the chemical reaction, sinter the matrix, harden the matrix, or otherwise cause the matrix to cure and/or change state (e.g., from a liquid to a solid) as it discharges from head 16. The amount of energy produced by the cure enhancer(s) may be sufficient to cure the matrix before structure 12 axially grows more than a predetermined length away from head 16. In one embodiment, structure 12 is at least partially cured before the axial growth length becomes equal to an external cross-sectional dimension of the matrix-coated reinforcement.

The matrix alone or together with the reinforcement may be discharged from head 16 via one or more different modes of operation. In a first example mode of operation, the matrix and/or reinforcement are extruded (e.g., pushed under pressure and/or mechanical force) from head 16 as head 16 is moved by support 14 to create the 3-dimensional trajectory within a longitudinal axis of the discharging material. In a second example mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, distributing loading, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor (e.g., a print bed, a table, a floor, a wall, a surface of structure 12, etc.). For example, at the start of structure formation, a length of matrix-impregnated reinforcement may be pulled and/or pushed from head 16, deposited at the anchor, and at least partially cured, such that the discharged material adheres (or is otherwise coupled) to the anchor. Thereafter, head 16 may be moved away from the anchor (e.g., via controlled regulation of support 14), and the relative movement may cause the reinforcement to be pulled from head 16. It should be noted that the movement of reinforcement through head 16 could be assisted (e.g., via one or more internal feed mechanisms), if desired. However, the discharge rate of reinforcement from head 16 may primarily be the result of relative movement between head 16 and the anchor, such that tension is created within the reinforcement. It is contemplated that the anchor could be moved away from head 16 instead of or in addition to head 16 being moved away from the anchor.

One or more controllers 20 may be provided and communicatively coupled with support 14 and/or head 16. Each controller 20 may include a single processor or multiple processors that are specially programmed or otherwise configured via software and/or hardware to control an operation of system 10. Controller 20 may further include or be associated with a memory for storing data such as, for example, design limits, performance characteristics, operational instructions, tool paths, and corresponding parameters of each component of system 10. Various other known circuits may be associated with controller 20, including power supply circuitry, signal-conditioning circuitry, solenoid driver circuitry, communication circuitry, and other appropriate circuitry. Moreover, controller 20 may be capable of communicating with other components of system 10 via wired and/or wireless transmission.

One or more maps may be stored in the memory of controller 20 and used by controller 20 during fabrication of structure 12. Each of these maps may include a collection of data in the form of lookup tables, graphs, and/or equations. In the disclosed embodiment, controller 20 may be specially programmed to reference the maps and determine movements of head 16 required to produce the desired size, shape, and/or contour of structure 12, and to responsively coordinate operation of (e.g., implement one or more pre-programmed algorithms for controlling) support 14, the cure enhancer(s), and other components of head 16.

An exemplary head 16 is disclosed in greater detail in FIGS. 2, 3, 4 and 5. As shown in these figures, any number of components of head 16 may be mounted to an upper plate 24 and/or a lower plate 26. For example, a reinforcement supply module 44 and/or a matrix supply module 46 may be operatively connected to upper plate 24, while a tensioning module 48, a clamping module 50, a wetting module 52, a cutting module 56, and/or a compacting/curing module 58 may be operatively mounted to lower plate(s) 26. It should be noted that other modules and/or mounting arrangements may also be possible. As will be described in more detail below, the reinforcement may pay out from module 44, pass through and be tension-regulated by module 48, and be wetted with matrix (e.g., as supplied by module 46) during discharge through module 52. After discharge, the matrix-wetted reinforcement may be selectively severed via module 56 (e.g., while being held stationary by module 50) and thereafter compacted and/or cured by module 58.

In some embodiments, the mounting arrangement may also include an enclosure 54 configured to enclose and protect components of head 16 from inadvertent exposure to light, matrix, solvents, dust, undesired temperatures, and/or other environmental conditions that could reduce usage and/or a lifespan of these components. These components may include, among others, any number of conduits, valves, actuators, chillers, heaters, manifolds, wiring harnesses, sensors, drivers, controllers, input devices (e.g., buttons, switches, etc.), output devices (e.g., lights, speakers, etc.) and other similar components.

Figure 6A:
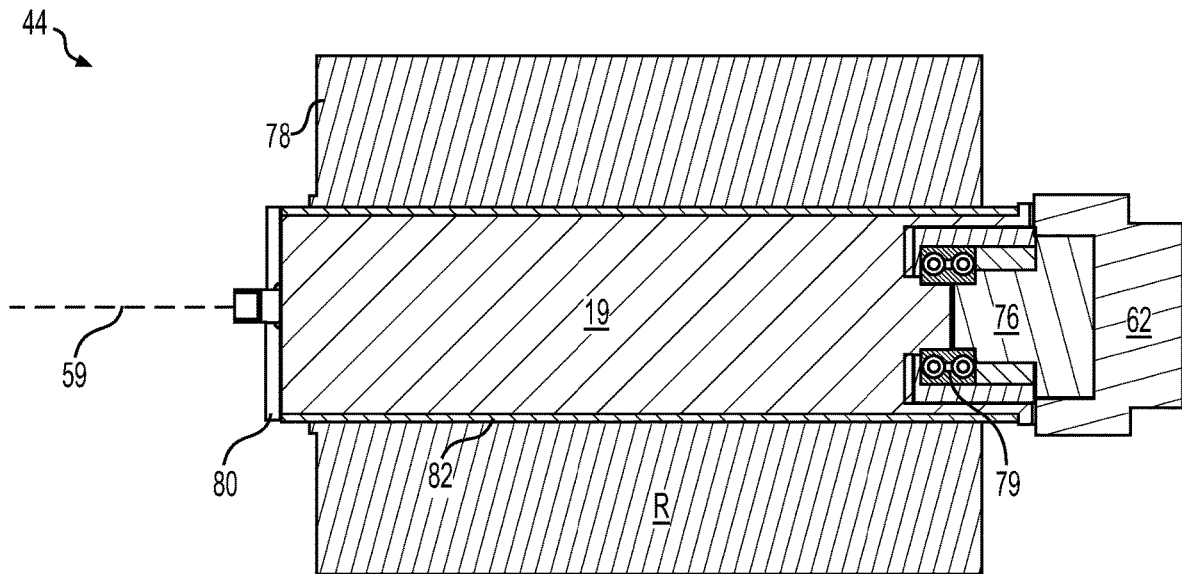
FIGS. 6A and 6B are cross-sectional illustration and diagrammatic illustrations, respectively, of an exemplary disclosed reinforcement supply portion of the print head of FIGS. 2-5.

As shown in FIG. 6A, module 44 may be a subassembly that includes components configured to selectively allow and/or drive rotation of creel 19. As will be discussed in more detail below, the rotation of creel 19 may be regulated by controller 20 (referring to FIG. 1) based, at least in part, on a detected parameter (e.g., position, orientation, or another parameter) of module 48. This rotational regulation may help to maintain one or more desired levels of tension within the reinforcement. For example, a nominal tension may be maintained during normal material discharge; a higher or lower level of tension may be maintained during free-space printing; and a higher or lower level of (e.g., no) tension may be maintained during severing of the discharging material.

The subassembly components of module 44 may include, among other things, a rotating actuator 62 operatively connecting creel 19 to at least one of upper and lower plates 24, 26 (e.g., to only lower plate 26). During operation, controller 20 may selectively activate rotating actuator 62 to cause creel 19 to rotate and pay out reinforcement from a spool 78 in coordination with the translation. In one example, rotating actuator 62 may include a rotor 76 rotationally affixed to creel 19. In this example, spool 78 may be easily removed (e.g., slipped axially off) from creel 19 and rotationally locked to rotor 76 (e.g., via a keyway, a friction device, etc.). Rotor 76 may be rotationally supported by lower plate 26 (or another parallel plate) via one or more bearings 79.

Figure 6B:
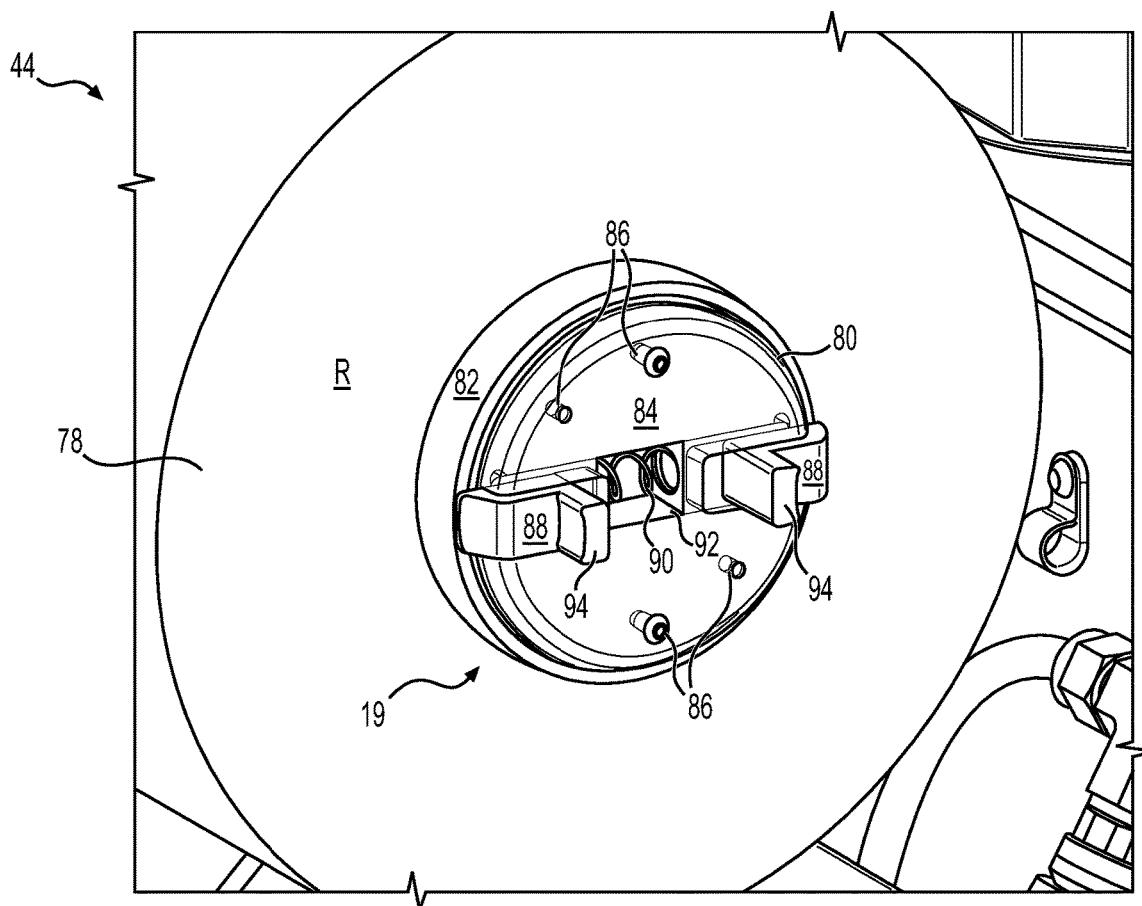

As shown in FIG. 6B, a quick-release mechanism 80 may be used to releasably connect spool 78 to creel 19 and to the rest of module 44. Spool 78 may include, among other things, a central core 82 configured to slide over and be received by creel 19, and one or more continuous reinforcements R wrapped around core 82. Mechanism 80 may include a flange 84 fixedly connected to an end of creel 19 opposite rotor 76 (e.g., via one or more fasteners and/or pins 86) and having an outer diameter less than an inner diameter of core 82. One or more tabs 88 may be moveably mounted to rotor 76, biased radially outward (e.g., via one or more springs 90), and manually and temporarily moved radially inward during installation. When tab(s) 88 are moved inward, core 82 may pass uninhibited by mechanism 80 over the end of creel 19. When tab(s) 88 are biased outward, tab(s) 88 may extend radially over at least a portion of (e.g., a rim) of core 82 to block spool 78 from inadvertently disengaging from creel 19.

Tab(s) 88 may slide within a channel 92 (e.g., in opposite directions) and include an inner end and an outer end. A fingerhold 94 may extend axially outward (i.e., relative to an axis of creel 19) from the inner end. Spring 90 may be disposed within channel 92, between the inner ends of tabs 88. The outer end of each tab 88 may be chamfered in the axial direction of creel 19, which may cause tab 88 to move radially inward against the bias of spring 90 in response to axial engagement with core 82.

Figure 7:
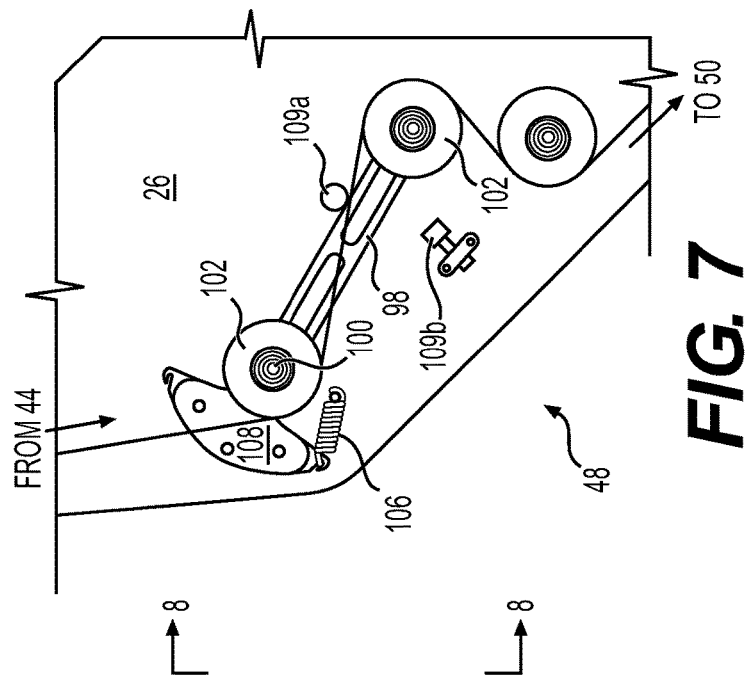
FIGS. 7 and 8 are diagrammatic and cross-sectional illustrations, respectively, of an exemplary disclosed tensioning module of the print head of FIGS. 2-5.
Figure 8:
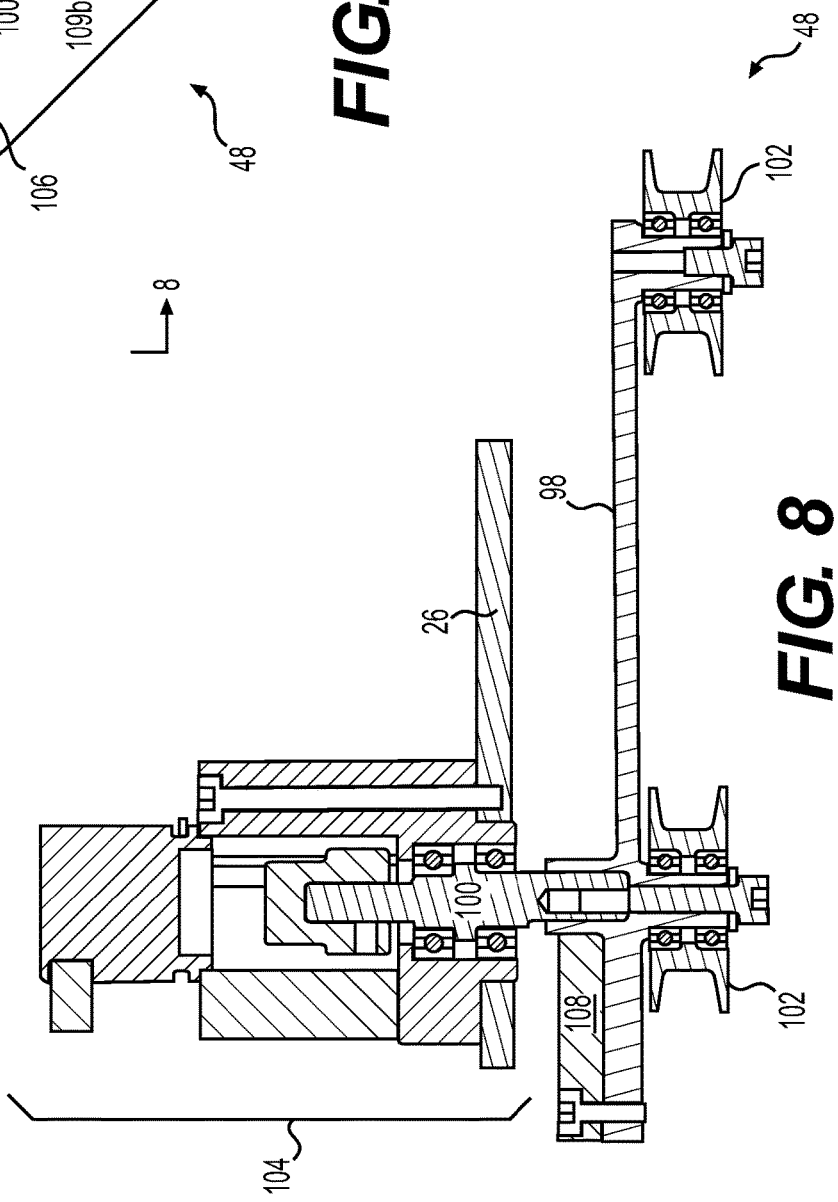

As shown in FIGS. 7 and 8, module 48 may be a subassembly located between modules 44 and 50 (e.g., relative to the travel of reinforcement through head 16) and include components configured to affect an amount and/or rate of the reinforcement being paid out by module 44 to module 50. These components may include, among other things, a swing arm 98 pivotally connected at one end (e.g., an end closest to module 44) to lower plate 26 via a pivot shaft 100, a redirect 102 rotatably mounted at each end of swing arm 98, and a rotary sensor (e.g., encoder, potentiometer, etc.) 104 (shown only in FIG. 8) connected to rotate with pivot shaft 100 (e.g., at a side of plate 26 opposite swing arm 98).

In the disclosed embodiment, because the pivot point of swing arm 98 is located at an end, swing arm 98 may not be balanced about the pivot point of shaft 100. If unaccounted for, this imbalance could cause swing arm 98 to function differently as head 16 is tilted to different angles during operation. Accordingly, in some applications, a counterweight 108 may be connected to or integrally formed with swing arm 98 at a side opposite the free end of swing arm 98.

In some embodiments, swing arm 98 may be biased (e.g., via one or more springs 106) toward an end or neutral position. Spring 106 may extend from one or more anchors on lower plate 26 to an end of counterweight 108 (e.g., a lower end located away from plate 24). In this embodiment, spring 106 is a tension spring. It is contemplated, however, that a single torsion spring mounted around pivot shaft 100 could alternatively be utilized to bias swing arm 98, if desired.

During operation, as the reinforcement is pulled out from head 16 at an increasing rate, swing arm 98 may be caused to rotate clockwise (e.g., relative to the perspective of FIG. 7) to provide a generally constant tension within the reinforcement. This rotation may result in a similar input rotation to sensor 104, which may responsively generate an output signal directed to controller 20 indicative of the increasing rate and/or tilt angle/position of swing arm 98. The signal may be directed to module 44 (e.g., directly or via controller 20), causing an increased payout (e.g., increased speed and/or amount of payout) of the reinforcement from creel 19. This increased payout may, in turn, allow swing arm 98 to return towards its nominal position. In one embodiment, a desired range of tension within the reinforcement may be about 0-5 lbs (e.g., about 0-1 lb). As the rate of reinforcement being pulled from head 16 decreases, spring 106 may rotate swing arm 98 in the counterclockwise direction to provide the generally constant tension within the reinforcement. During this counterclockwise motion, sensor 104 may again generate a signal indicative of the rotation and direct this signal to controller 20 for further processing and control over module 44 (e.g., to cause a slowing payout of the reinforcement). It should be noted that controller 20 may process this signal and control module 44 via P, PI, PID, and/or other control methodologies, as desired.

One or more end-stops 109 may be associated with module 48 to limit a range of rotation of swing arm 98. In the disclosed embodiment, two different end-stops are provided, including a hard end-stop 109a and a high-tension end stop 109b. Swing arm 98 may naturally rest against hard end stop 109a due to the bias of spring 106. Swing arm 98 be selectively driven into high-tension end stop 109b during a severing event.

Figure 9:
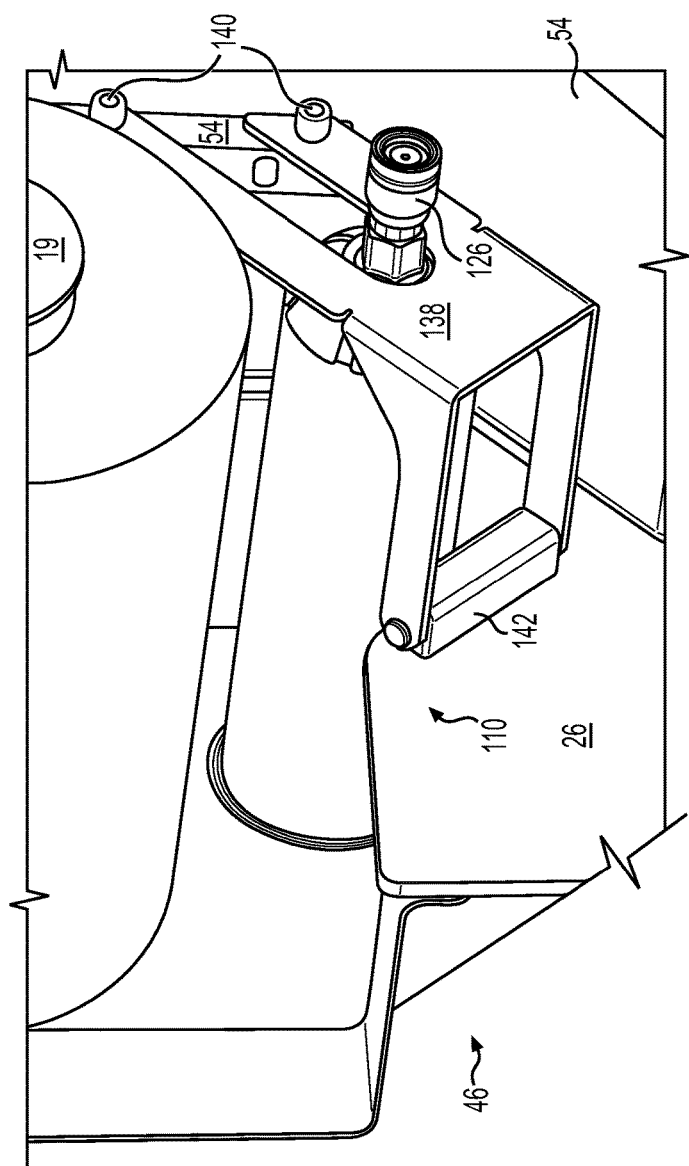
FIGS. 9 and 10 are diagrammatic and cross-sectional illustrations, respectively, of an exemplary disclosed matrix supply portion of the print head of FIGS. 2-5.
Figure 10:
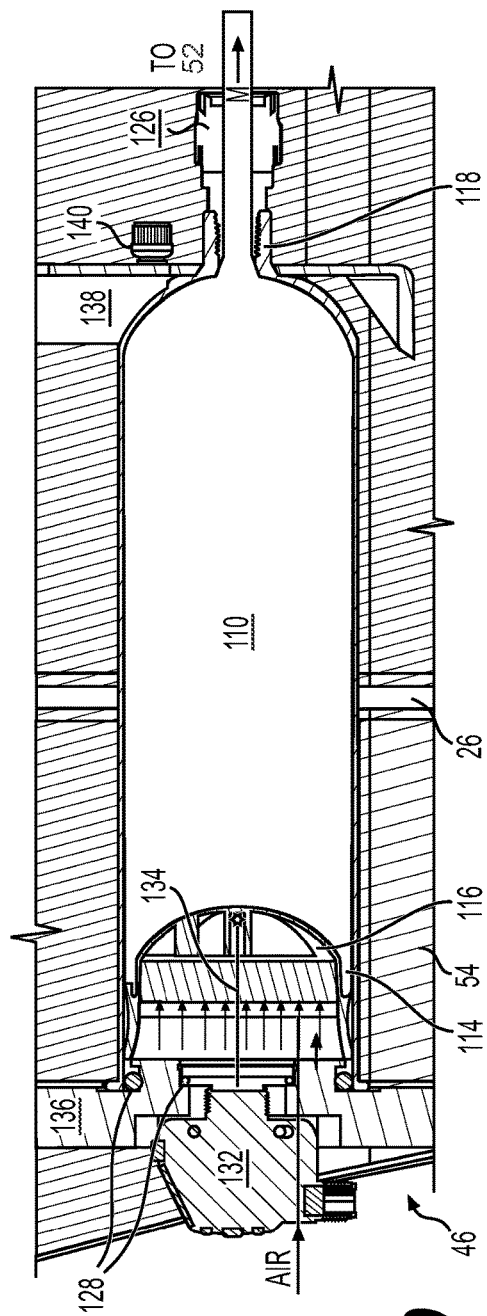

Module 46 may be configured to direct a desired amount of matrix at a specified rate, temperature, viscosity, and/or pressure to module 52 for wetting of the reinforcements received from module 44 via module 48. As shown in FIGS. 9 and 10, module 46 may be an assembly of components that receive, condition and/or meter out matrix M from a disposable cartridge 110. Cartridge 110 may include, among other things, a tubular body 114, a cap 116 configured to close a base end of body 114, and a restricted outlet 118 located at an opposing tip end. The matrix inside body 114 may be selectively pressed through outlet 118, by moving cap 116 through body 114 towards outlet 118.

A pressure-regulated medium (e.g., air) may be directed through against cap 116 at the base end of cartridge 110 to generate a force in the direction of outlet 118. The matrix discharging from outlet 118 may be directed through a port 126 toward module 52. In this way, a pressure and/or a flow rate of the medium into cartridge 110 may correspond with an amount and/or a flow rate of matrix out of cartridge 110. It is contemplated that a linear actuator, rather than the pressurized medium, may be used to push against cap 116, if desired. Again, it is contemplated that controller 20 may implement P, PI, PID, and/or other control methodologies to regulate the flow of matrix from cartridge 110, as desired.

During discharge of the matrix from cartridge 110, care should be taken to avoid depletion of matrix partway through fabrication of structure 12 (and/or at an unexpected time). For this reason, a sensor 132 may be associated with cartridge 110 and configured to generate a signal indicative of an amount of matrix consumed from and/or remaining within cartridge 110. In the depicted example, sensor 132 is an optical sensor (e.g., a laser sensor) configured to generate a beam 134 directed to cap 116 from the base end of cartridge 110. Beam 134 may reflect off cap 116 and be received back at sensor 132, wherein a comparison of outgoing and incoming portions of beam 134 produces a signal indicative of the consumed and/or remaining matrix amount. The signal may be used to generate an alert to a user of system 10, allowing the user to adjust operation (e.g., to pause or halt operation, park print head 16, swap out print heads 16, etc.), as desired. It is contemplated that another type of sensor (e.g., a magnetic sensor, an acoustic sensor, etc.) could be associated with cap 116 and configured to generate corresponding signals, if desired.

As shown in FIG. 10, one or more seals 128 may be located at the base end of cartridge 110, adjacent a mounting plate 136. Sensor 132 may be a standalone sensor having a nipple through which beam 134 is directed. A plate of transparent material (e.g., glass) may separate the nipple from cartridge 110, such that sensor 132 Is protected from internal pressures and resin contamination. Beam 134 may pass through the transparent material substantially uninterrupted, such that an optical path is created to cap 116. Compliant material around the transparent material may function as seal 128, thereby prolonging a life of sensor 132.

It should be noted that the matrix contained within cartridge 110 may be light-sensitive. Accordingly, care should be taken to avoid exposure that could cause premature curing. In the disclosed embodiment, cartridge 110 may be opaque, transparent and tinted, coated (internally and/or externally), or otherwise shielded to inhibit light infiltration.

In some applications, handling and/or curing characteristics of the matrix may be affected by a temperature of the matrix inside of module 46. For this reason, module 46 may be selectively heated, cooled, and/or insulated accordingly to one or more predetermined requirements of a particular matrix packaged within cartridge 110. For example, one or more heating elements (e.g., electrodes—not shown) may be mounted inside of and/or outside of cartridge 110 and configured to generate heat conducted through to the matrix therein. Controller 20 may be in communication with the heating element(s) and configured to selectively adjust the output of the heating element(s) based on a known and/or detected parameter of the matrix in module 46.

Cartridge 110 may be mounted in a way to allow simple and quick removal from head 16 and replacement upon depletion of the matrix contained therein. As shown in FIG. 9, a retainer 138 may include a first end pivotally connected to plate 26 (e.g., via a hinge 142), and a second end configured to pass over outlet 118 and fixedly engage enclosure 54 (e.g., via one or more fasteners 140). The pivoting motion of retainer 138 over outlet 118 may bias cartridge 110 toward sensor 132 (referring to FIG. 10), thereby sandwiching seal(s) 128 and inhibiting undesired leakage.

Figure 11:
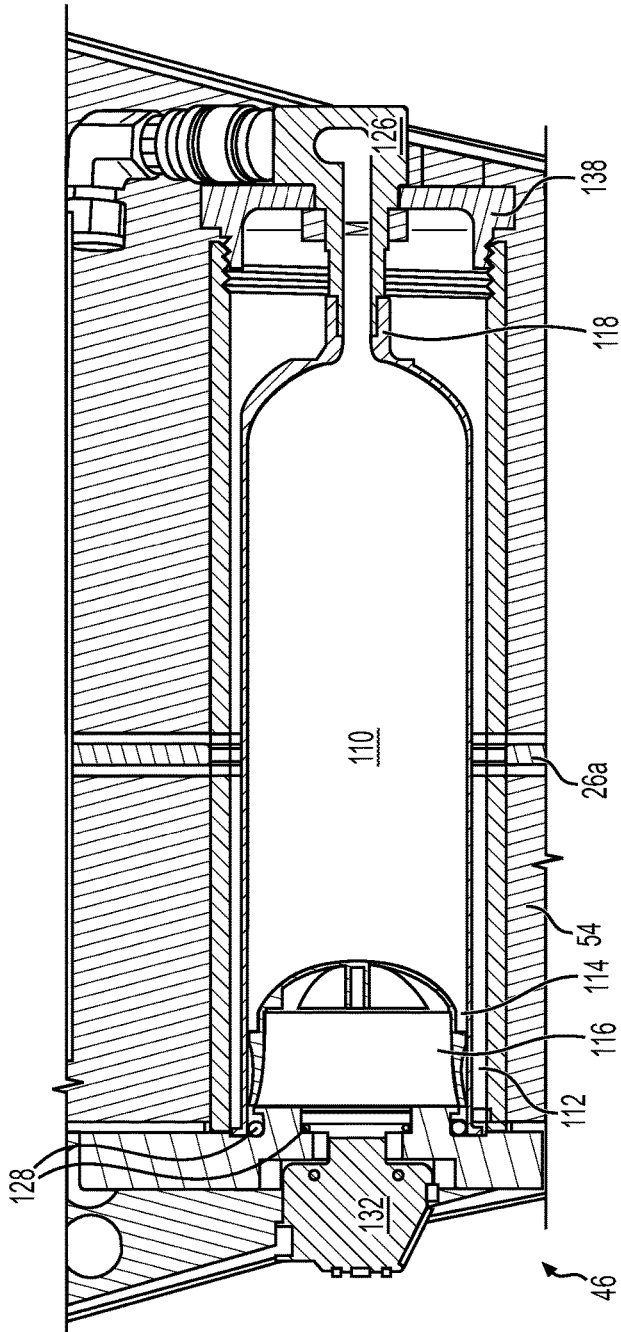
FIGS. 11 and 12 are cross-sectional and diagrammatic illustrations, respectively, of another exemplary disclosed matrix supply portion of the print head of FIGS. 2-5.
Figure 12:
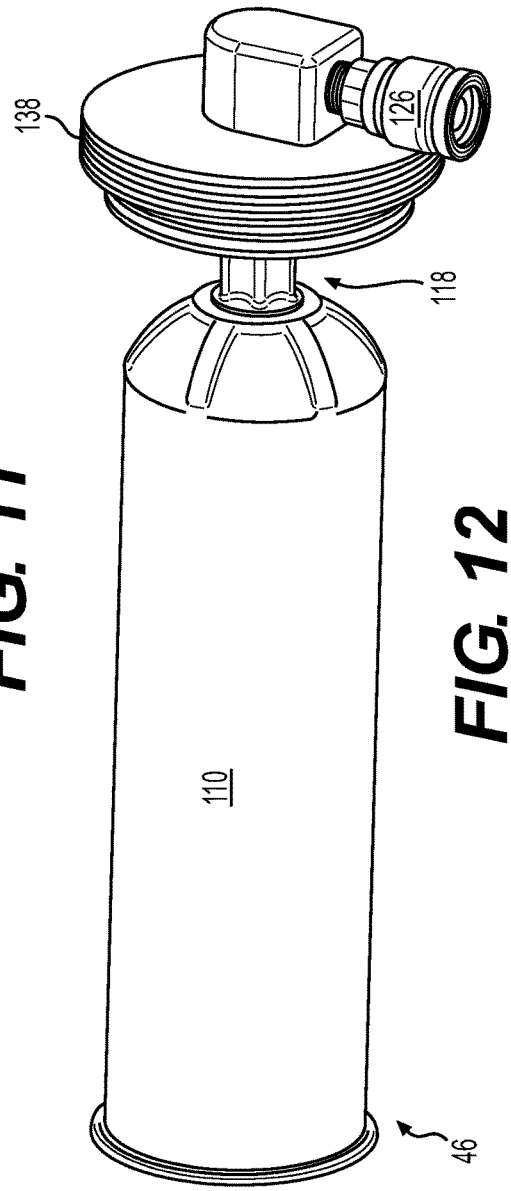

In an alternative embodiment shown in FIGS. 11 and 12, retainer 138 no longer embodies a pivoting arm. Instead, retainer 138 of FIGS. 11 and 12 may embody a cap that threadingly engages a vessel 112 configured to hold cartridge 110. In this embodiment, a port 126 may be rotatably mounted in retainer 138 and threadingly engaged with outlet 118 of cartridge 110.

Figure 14:
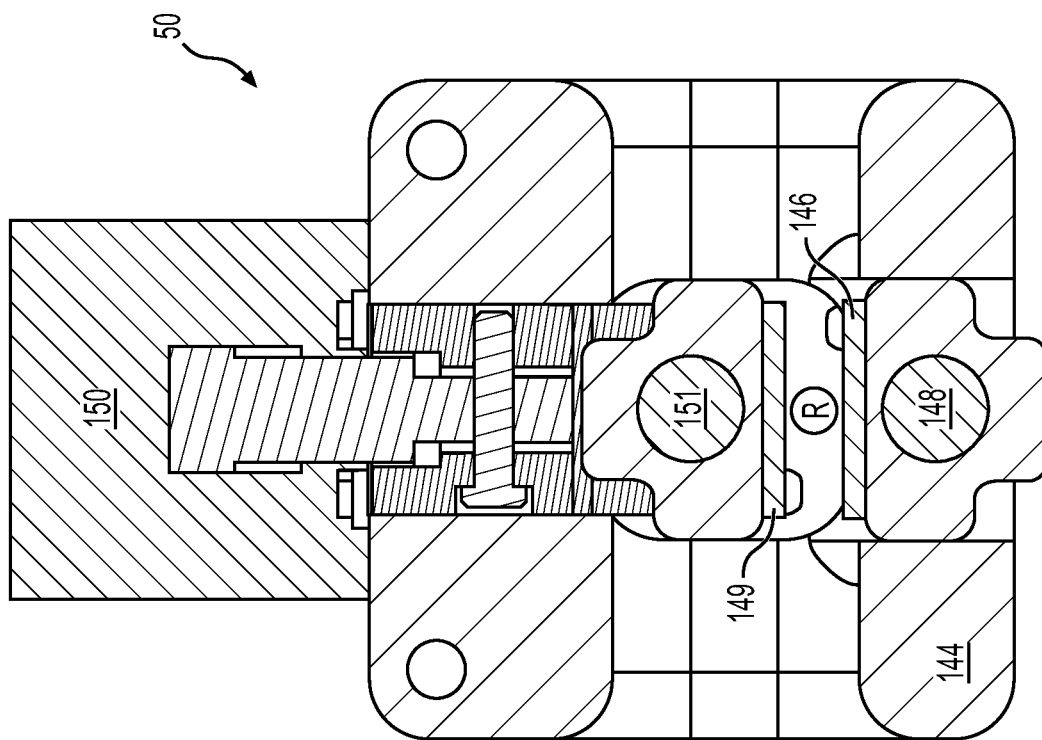
FIGS. 13 and 14 are diagrammatic illustrations of an exemplary disclosed clamping module of the print head of FIGS. 2-5.
Figure 13:
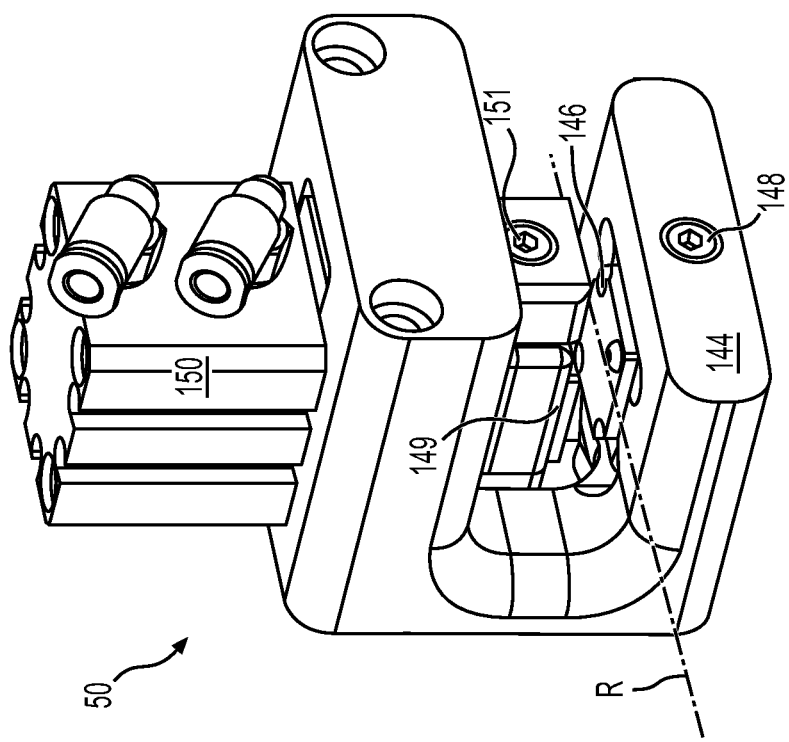

As shown in FIGS. 13 and 14, clamping module 50 may be a subassembly having components that cooperate to selectively clamp the reinforcement R and thereby inhibit movement (e.g., any movement or only reverse movement) of the reinforcement through head 16. This may be helpful, for example, during severing of the reinforcement away from structure 12, such that tensioning module 48 does not unintentionally pull the reinforcement back through head 16. This may also be helpful during off-structure movements of head 16 (e.g., when no reinforcement should be paying out) and/or briefly at a start of a new payout (e.g., while tacking the reinforcement at the anchor). In each of these scenarios, clamping module 50 may selectively function as a check-valve, ensuring no or only unidirectional movement of the reinforcement through head 16. By allowing at least some movement of the reinforcement at all times, damage to the reinforcement may be reduced.

The components of module 50 may include, among other things, a yoke 144 that is removably connectable to mounting plate 26, a stationary foot 146 pivotally connected to yoke 144 via a shaft 148, a translatable foot 149 oriented in opposition to foot 146, and an actuator (e.g., a linear cylinder) 150 that is mounted to yoke 144 at a side opposite foot 146 and shaft 148. Foot 149 may be pivotally connected to actuator 150 (e.g., to a rod-end of the linear cylinder) via a shaft 151 and selectively moveable towards and away from foot 146 by actuator 150. The motion of foot 149 towards foot 146 may result in the reinforcement R being sandwiched therebetween. The pivotal motion of feet 146. 149 about shafts 148, 151, respectively, may allow for misalignments between the feet. The feet may be fabricated from and/or coated with a friction enhancing surface (e.g., rubber) to promote gripping of the reinforcement. In some embodiments, the friction enhancing surface may be compliant to avoid damage of the reinforcement during gripping.

As shown in FIG. 13, yoke 144 may have a generally C-shaped cross-section. The reinforcement received from module 48 may pass through the opening of the C-shape at a location between feet 146, 149. When actuator 150 is moved to a retracted position (e.g., during a threading and/or payout event—shown in FIG. 13), foot 149 may be pulled away from the reinforcement, such that movement of the reinforcement through yoke 144 is uninhibited by the feet. When actuator 150 is in an extended position (shown in FIG. 14), foot 149 may force the reinforcement downward against foot 146, thereby inhibiting continued motion of the reinforcement.

It is contemplated that other configurations of module 50 may be utilized to selectively clamp the reinforcement passing therethrough. For example, rather than the clamping motion be exerted from only one side of the reinforcement (e.g., toward a stationary side), the clamping motion could be exerted from both sides of the reinforcement towards a central point at the reinforcement. It should be noted that, when clamping is undesired, the components of module 50 may be moved completely out of the way of the reinforcement such that a trajectory and/or force acting on the reinforcement is unaffected by module 50.

As shown in FIGS. 15 and 16, wetting module 52 may generally be a two-piece subassembly (i.e., a subassembly having two larger or primary components and any number of smaller or secondary components). The primary components may include an elongated (e.g., elongated in a direction of reinforcement motion through module 52) base 152 having an inlet end 154 and an outlet end 156, and a lid 158 that is pivotally or otherwise removably connected to base 152 at the inlet end 154 (e.g., via a pin 160). A seal 161 may be disposed between base 152 and lid 158, and any number of fasteners (or quick release or toolless mechanisms) 162 may connect lid 158 to base 152 at one or more location(s) between pin 160 and outlet end 156. It is contemplated that the general location of pin 160 may be switched to an opposing end or be located at both ends (e.g., instead of utilizing fasteners 162), if desired. Lid 158 may be configured to pivot or otherwise move from a closed or operational position (shown in FIG. 15) to an open or servicing (e.g., threading/cleaning) position (shown in FIG. 16). A retainer 163 may be used to selectively hold lid 158 in the open position during servicing.

Base 152 and/or lid 158 may include one or more features 164 for mounting module 52 to the rest of head 16. Features 164 may include, for example, bosses, holes, recesses, threaded bores, studs, dowels, brackets, clips, etc. The number and locations of features 164 may be selected based on a weight, size, material, and/or balance of module 52.

Base 152 and lid 158 may together form an enclosure configured to receive any number of nozzles 168 and/or teasing mechanisms 169. In the disclosed embodiment, four nozzles 168A, 168B, 168C and 168D are disposed in series along a trajectory of the reinforcement passing through module 52. It is contemplated, however, that a different number (e.g., a greater number or a lesser number) of nozzles 168 may be utilized as desired. As will be explained in more detail below, nozzles 168 may function to limit an amount of matrix passing through module 52 with the reinforcement. Accordingly, in most instances, at least one entry nozzle 168A and at least one exit nozzle 168D should be employed to reduce undesired passage of matrix out of module 52 (e.g., in upstream and downstream directions).

Nozzles 168 may divide the enclosure of module 52 into one or more sections or chambers. In the disclosed embodiment, nozzles 168 divide the enclosure into a main wetting chamber 170 (e.g., located between nozzles 168B and 168C), an upstream overflow chamber 172 (e.g., located between nozzles 168A and 168B), and a downstream overflow chamber 174 (e.g., located between nozzles 168C and 168D). As will be explained in more detail below, chamber 170 may be a primary location at which the reinforcement is intended to be wetted with matrix. While the reinforcement may additionally be wetted within each of the overflow chambers 172 and 174 (e.g., when overflow matrix is inadvertently present within these chambers), overflow chambers 172 and 174 may primarily be intended as locations where excess resin can be collected and removed from module 52. The collection and removal of excess resin from overflow chambers 172 and 174 may help to inhibit undesired leakage from module 52.

Nozzle 168 may have different sizes and/or configurations that promote fiber wetting and resin retention under pressure. For example, nozzles 168A, 168B, and 168C may be the same and slightly larger than 168D (e.g., have a larger internal cross-sectional area), in some applications. This may reduce tension on the reinforcement during pulling through main wetting chamber 170, yet still ensure precise control over a matrix-to-fiber ratio in the material ultimately discharging from module 52. In another example, the nozzle (s) 168 located upstream of mechanism 169 may have a shape that substantially matches an as-fabricated shape of the reinforcement (e.g., rectangular), while the nozzles 168 located downstream of mechanism 169 may have a shape (e.g., circular or elliptical) designed to achieve a desired characteristic (enhanced steering and/or placement accuracy) within structure 12. It should be noted that circular or elliptical nozzles 168 may also be simpler and/or less expensive to manufacture with higher tolerances.

Teasing mechanism(s) 169, if included within module 52, may be located inside main wetting chamber 170 and facilitate the intrusion and/or disbursement of matrix throughout the reinforcement. In one example, this may be achieved by providing one or more pressure surfaces over which the reinforcements pass during transition through chamber 170. The pressure surfaces may press the matrix through the reinforcements. In another example, the intrusion and/or disbursement of matrix may be facilitated by the spreading out and/or flattening of individual fibers that make up the reinforcement (e.g., without generating a significant pressure differential through the reinforcement). In the disclosed example, multiple teasing mechanisms 169 cooperate to perform all of these functions at the same time.

In the embodiment of FIGS. 15 and 16, mechanisms 169 includes three rollers that are spaced apart from each other in the direction of reinforcement travel. With this configuration, the rollers may alternatingly press against opposing sides of the reinforcement. The rollers spaced furthest apart from each other may have axes that lie within a common plane. The middle roller may have an axis that is parallel with the plane, but offset in a normal direction by a distance Y. The rollers, together, may cause the reinforcement to deviate from a straight-line path through module 52, and the distance Y may correspond with an internal angle α of the deviation. A greater distance Y (and a corresponding smaller internal angle α) may relate to a greater pressure differential generated by each roller and/or a greater amount of spreading/flattening. However, a greater distance Y may also relate to a greater drag force acting on the reinforcement. In the disclosed embodiment, the distance Y may be about 0-15 mm (e.g., about 0-5 mm) and result in a corresponding interior angle α of about 60-150° (e.g., about 110-145°).

In some applications, the offset distance Y may be related to parameters of the reinforcement, the matrix intended to be effectively used inside module 52, and/or a sizing applied to the reinforcement by the reinforcement manufacturer. For example, brittle fibers may need more gentle redirecting by either fabricating the rollers to have larger diameters and or making the offset distance smaller. In another example, fibers with larger filaments (e.g., fiberglass has larger filaments than carbon fiber; T1100 carbon fiber has smaller filaments than AS4 carbon fiber; etc.) may be easier to impregnate and therefore require less redirection and/or pressure. In yet another example, smaller tow sizes (e.g., 3 k, 300 tex) may be easier to impregnate through their thickness than larger (e.g., 12 k, 1200 tex) and therefor require less redirection and/or pressure. Lower viscosity resins are also easier to impregnate with. In general, the offset distance Y may grow as a cross-sectional area of the reinforcement and/or a viscosity of the matrix increases. The growing offset distance Y may result in a higher-pressure differential through the reinforcement that drives migration of the matrix.

Matrix may be introduced into chamber 170 via an inlet port 176, and excess matrix may be drained from overflow chambers 172, 174 via corresponding outlet ports 178. Matrix may only enter chamber 172 from chamber 170 via nozzle 168B (e.g., by leaking around the reinforcement passing in the opposite direction and/or around nozzle 168B itself). Matrix may only enter chamber 174 from chamber 170 via nozzle 168C (e.g., by being pulled with and/or leaking around the reinforcement passing through nozzle 168C and/or around nozzle 168C itself). Outlet 118 of module 46 may be connected to port 176 via a conduit (shown in FIGS. 2-5), and signals generated by a pressure sensor 180 may be used to responsively regulate operation of module 46. A low-pressure source 181 (shown only in FIG. 23) may connect with ports 178 to remove the excess matrix collected within chambers 172, 174. In some embodiments, the removed excess resin may be recirculated back into module 52 via inlet port 176 or another suitable port (not shown).

It should be noted that low-pressure source 181, in some embodiments, may only be activated when resin flow from module 46 into module 52 is inhibited or the passage therebetween is otherwise blocked (e.g., via deactivation of module 42 and/or activation of matrix passage clamp). This may help to reduce introduction of air and/or contaminated matrix in reverse direction back into cartridge 110.

In some applications, a temperature of module 52 (e.g., of the matrix inside of module 52) may be regulated for enhanced wetting and/or curing control. In these applications, a heater (e.g., a ceramic heating cartridge) 182 and a temperature sensor (e.g., a Resistance Temperature Detector—RTD) 184 may be utilized and placed at any desired location. In the disclosed example, heater 182 is located upstream of sensor 184, such that the matrix is heated before passing by sensor 184. The matrix may be heated to about 20-80° C. (e.g., 20-60° C.), depending on the application, the reinforcement being used, the matrix being used, and/or desired curing conditions. In general, a higher viscosity resin, a larger tow, and/or an opaquer reinforcement may require higher temperatures within module 52. However, care should be taken to avoid exceeding a cure-triggering temperature threshold inside of module 52.

The materials of module 52 may be selected to provide desired performance characteristics. For example, base 152 and/or lid 158 may be fabricated from aluminum to provide a lightweight, easily machinable and low-cost component. In some embodiments, the aluminum may be coated with a non-stick and/or inert layer that protects against degradation by the matrix. This may include, for example a coating of Polytetrafluoroethylene (PTFE), parylene, or another polymer. Nozzles 168 may be fabricated from a high-hardness material for longevity in a highly abrasive environment (e.g., an environment caused by engagement with the continuous reinforcements). This material may include, for example, stainless steel (e.g., 303, 304 and/or 440c). In some applications, the stainless steel may need to be passivated to eliminate contact and reaction between iron within the stainless steel and the matrix. Alternatively, nozzles 168 may be fabricated from a ceramic material, if desired. Components of mechanism 169 may be fabricated from PTFE to provide low-friction characteristics and kept as small as possible to reduce mass and inertia. Seal 161 may be fabricated from a closed-cell foam, such as a synthetic rubber and fluoropolymer elastomer commercially known as Viton, Tigon, silicon, or a PTFE foam.

Figure 17:
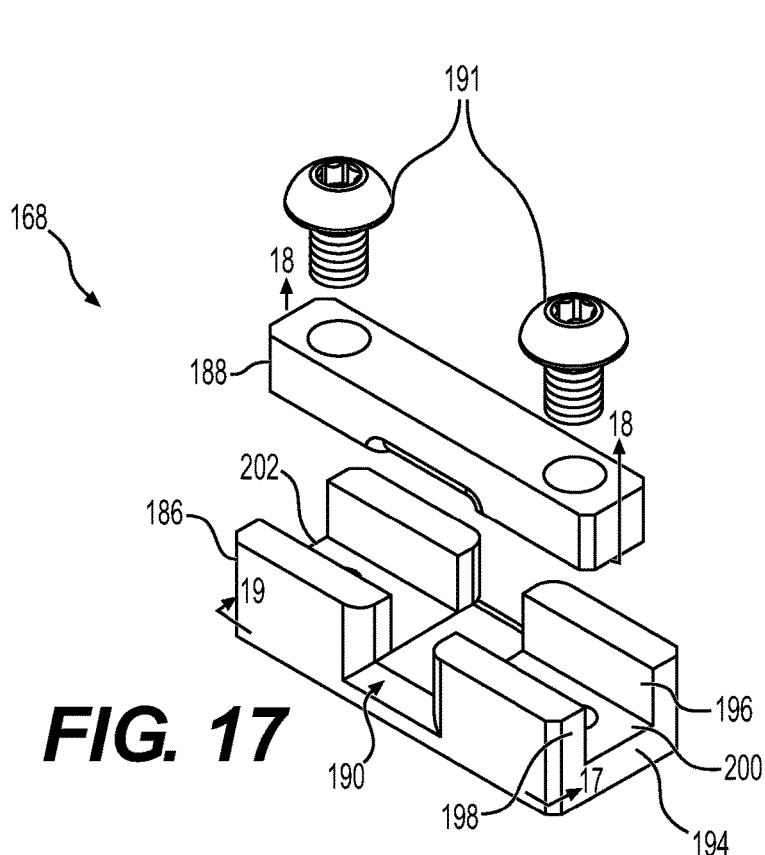
FIGS. 17, 18 and 19 are diagrammatic illustrations of an exemplary disclosed nozzle that may be used with the wetting module of FIGS. 15-16.
Figure 18:
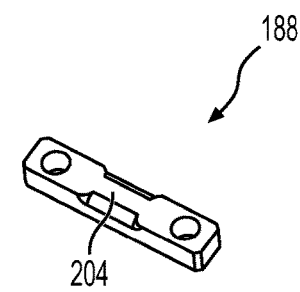
Figure 19:
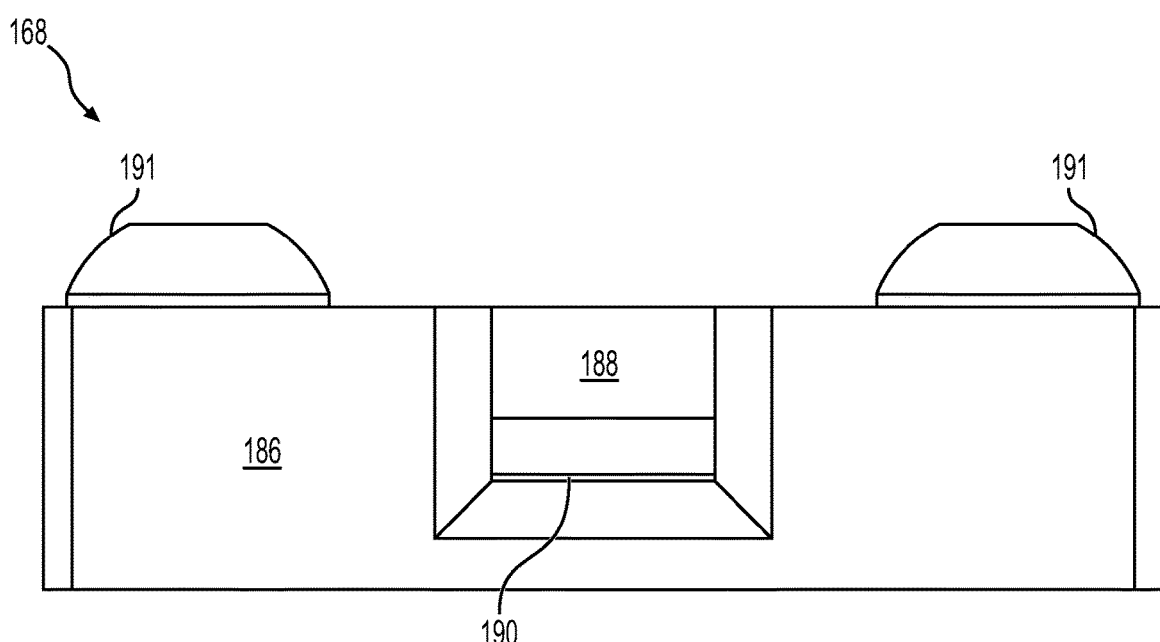

FIGS. 17, 18 and 19 illustrate an exemplary nozzle 168. As shown in these figures, nozzle 168 may generally embody a 2-piece rectangular unit, including a base 186 and a lid 188 that together define a channel 190 through which the reinforcement passes. One or more fasteners 191 may be located at transverse sides of channel 190, to connect lid 188 to base 186. The rectangular unit may be removably fitted into corresponding rectangular slots formed in base 152 of module 52, and oriented transversely to the travel direction of the reinforcement through module 52. In the disclosed embodiment, each nozzle 168 may be completely recessed within base 152. However, it is contemplated that nozzle 168 could be partially recessed within each of base 152 and lid 158, if desired (although this may increase a machining cost and complexity of module 52).

Base 186 of nozzle 168 may be configured to internally receive lid 188. For example, base 186 may form a three-sided enclosure, including an elongated spine 194, an entrance side 196 connected to an upstream long edge of spine 194, and an exit side 198 connected to a downstream long edge of spine 194 opposite entrance side 196. Entrance and exit sides 196, 198 may extend a distance past an inner surface 200 of spine 194 to form a slot 202 that is oriented orthogonally to channel 190. Lid 188, when assembled to base 186, may fit completely into slot 202, such that outer surfaces of lid 188 are generally flush with short and long sides of entrance and exit sides 196, 198. Inner surface 200 of spine 194 may be recessed or stepped down away from lid 188 at a central location to form three connected sides (e.g., a lower portion) of channel 190. An inner surface 204 of lid 188 may be generally planar and form the fourth side of channel 190. With this configuration, a depth of channel 190 may be defined solely by the step formed within inner surface 200, thereby allowing for easy machinability via conventional processes and high tolerances of channel 190. In the disclosed example, the tolerances of channel 190 may be about +/−0.00025", allowing for variance in a fiber-to-matrix ratio to be limited at about 2.5%. Outer edges of channel 190 may be rounded to reduce damage to the reinforcement passing therethrough.

In some embodiments, the rectangular shape of channel 190 may provide for optimum use of a similarly shaped reinforcement. That is, a reinforcement having a rectangular cross-section may pass through the rectangular shape of channel 190 without significant distortion. This may allow the reinforcement to be laid down against an underlying surface in a smooth or flat manner that reduces voids or undesired (e.g., uneven or bumpy) contours. However, it has been found that a rectangular discharge from channel 190 can be caused to roll, fold, or overlap itself inside and/or outside of nozzle 168 during discharge along a transversely curving trajectory. This may cause nozzle 168 to clog and/or result in undesired contours in the resulting surface of structure 12 at the curve. Accordingly, in some embodiments, channel 190 may have a circular or ellipsoid shape that facilitates smoother curving trajectories. In yet other embodiments, channel 190 may have only a curving shape (e.g., an arc of a circle, with a flat top) rather than a complete circle or ellipsoid, if desired.

Figure 20:
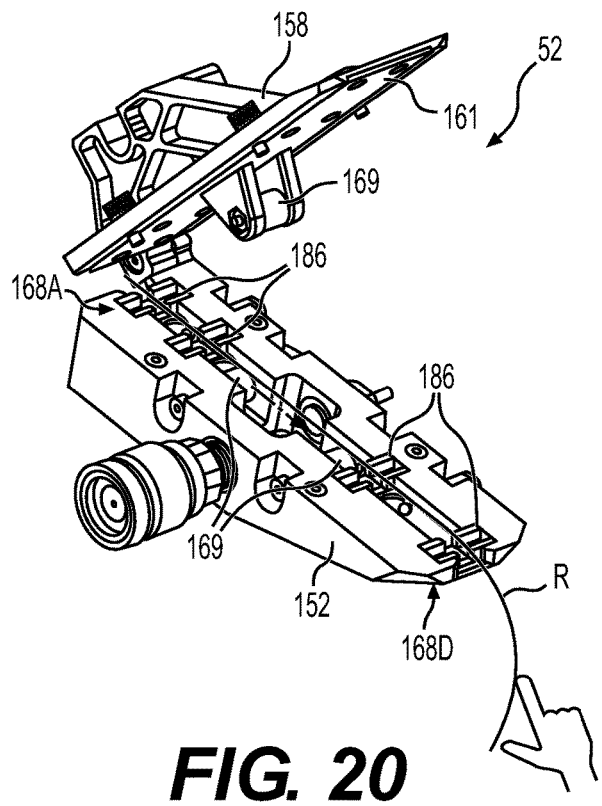
FIGS. 20, 21, and 22 are diagrammatic illustrations of the wetting module of FIGS. 15 and 16, illustrating an exemplary disclosed threading process.
Figure 21:
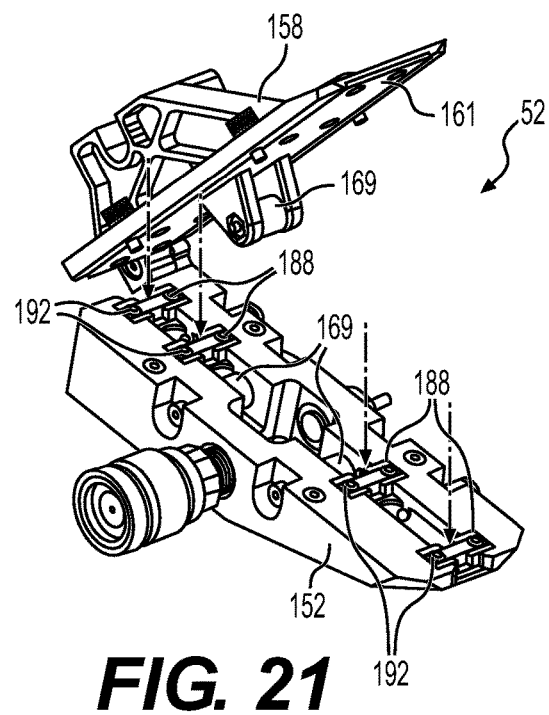
Figure 22:
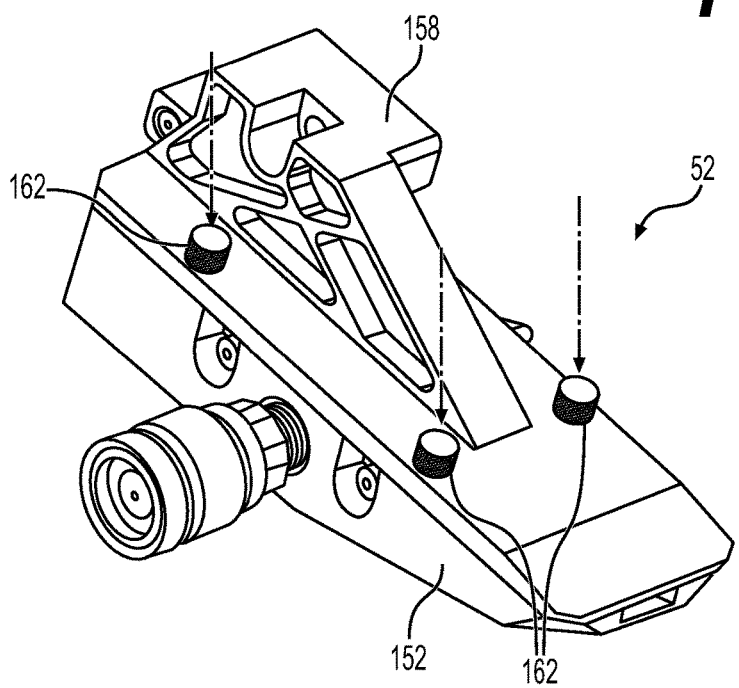

Module 52 may be designed to simplify threading of reinforcement therethrough. For example, as shown in FIGS. 20, 21 and 22, threading may generally be a three-step process (e.g., when starting with an open module 52 and lids 188 of nozzles 168 being disassembled from bases 186). These steps may include pulling of the reinforcement through channels 190 of bases 186, starting with nozzle 168A and ending with nozzle 168D (See FIG. 20). With module 52 being open (e.g., with lid 158 being pivoted away from base 152), the reinforcement may be pulled in a straight-line trajectory through channels 190 and over the furthest apart features of mechanism 169 (i.e., the middle feature of mechanism 169 may be out of the way and not require special routing of the reinforcement). The second step may include installation of lids 188 into slots 202 of bases 186 via fasteners 191 (See FIG. 21). The third step may include pivoting of lid 158 against base 152 and securing via fasteners 162 (See FIG. 22). It should be noted that, during the third step, the middle feature of mechanism 169 may push against the reinforcement and cause displacement by the distance Y (referring to FIG. 15). The closure of lid 158 may function to sandwich seal 161 between lid 158 and base 152, thereby inhibiting undesired leakage of matrix from module 52.

Reinforcement discharging from module 52 may pass finally through nozzle 168D. In one embodiment, nozzle 168D has a cross-sectional (e.g., rectangular) shape substantially matching a cross-sectional shape of the reinforcement. An area of the cross-section may be selected to limit an amount of matrix clinging to the reinforcement and passing through the downstream nozzle 168D. In one embodiment, the cross-sectional area of nozzle 168D may be 0-150% (e.g., 0-120%) greater than the cross-sectional area of the reinforcement alone. It is contemplated that upstream nozzles 168A-C may have the same geometry as nozzle 168D to simplify and lower a cost of module 52. However, it is also contemplated that the upstream nozzles 168A-C could have different geometries (e.g., larger openings to reduce drag or smaller openings to limit leakage), if desired.

Modules 50 and 52 may be configured to move together relative to the rest of head 16. This movement may occur, for example, before, during, and/or after a severing event (e.g., after completion of a print path, during rethreading and/or during start of a new print path). As shown in FIG. 23, modules 50 and 52 may be rigidly connected to each other via a bracket 192 that translates (e.g., rolls and/or slides linearly) along a rail 193 affixed to plate 26. Bracket 192 may extend through a cutout formed within plate 26, with modules 50 and 52 located at a first side of plate 26 and rail 193 located at a second side of plate 26. As shown in FIGS. 23 and 24, an actuator 197 may be mounted to plate 26 at the second side and mechanically linked to bracket 192. With this configuration, an extension or retraction of actuator 197 may result in translation of bracket 192 and connected modules 50, 52 (modules 50, 52 omitted from FIG. 24 for clarity) along rail 193. In some embodiments, source 181 may be mounted to module 52 and/or bracket 192, such that source 181 also moves together with modules 50, 52.

It should be noted that, during the translation of bracket 192 and modules 50, 52 along rail 193, the reinforcement passing through modules 50, 52 may remain stationary or translate, depending on an actuation status of module 50. For example, when module 50 is active and clamping the reinforcement at a time of translation, the reinforcement may translate together with modules 50 and 52. Otherwise, a tension within the reinforcement may function to hold the reinforcement stationary, move the reinforcement in a direction opposite the translation, or move the reinforcement in the same direction of the translation at a different speed. A sensor 199 may be associated with bracket 192 (e.g., disposed between plate 26 and bracket 192) to track the motion of modules 50, 52 and/or the payout of reinforcement. Sensor 199 may include, for example, a sensing component 201 stationarily mounted to plate 26, and an indexing component (e.g., a magnet) 202 mounted to bracket 192. The motion of modules 50, 52 may be coordinated with the motions of modules 56 and 58, as will be described in more detail below.

Figure 25:
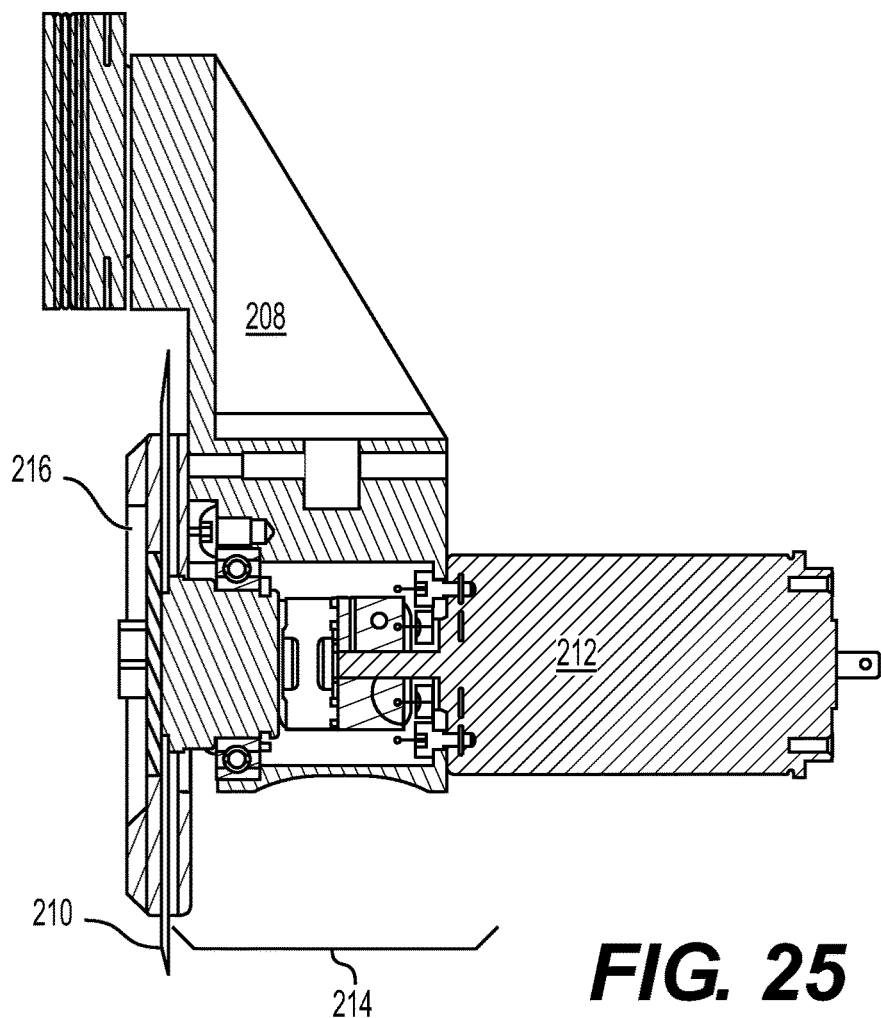
FIGS. 25 and 26 are cross-sectional and diagrammatic illustrations of an exemplary disclosed cutting module of the print head of FIGS. 2-5.
Figure 26:
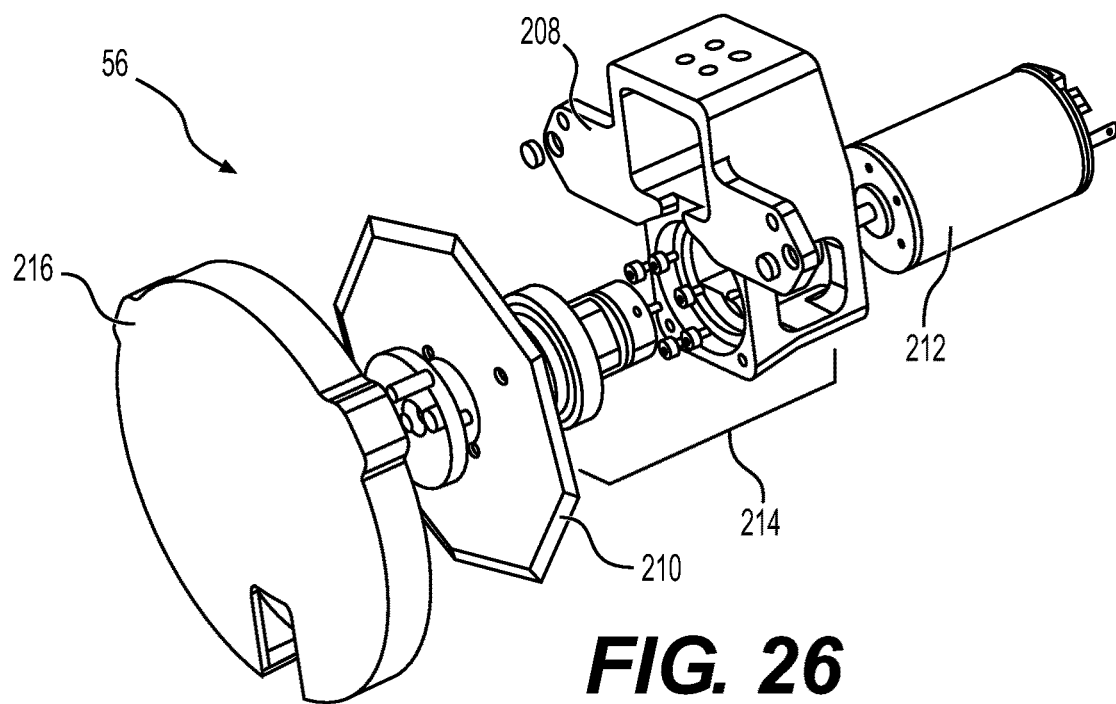

An exemplary module 56 is illustrated in FIGS. 25 and 26. As shown in these figures, module 56 may be an assembly of components that cooperate to sever the reinforcement passing from module 52 to module 58. These components may include, among other things, a mounting bracket 208, a cutting mechanism (e.g., a rotary blade) 210; a cutting actuator (e.g., a rotary motor) 212 connecting mechanism 210 to bracket 208 via associated hardware (e.g., bearings, washers, fasteners, shims, dampers, couplers, retaining rings, etc.) 214, and a cover 216 (removed from FIG. 25 for clarity) configured to at least partially enclose (e.g., enclose on at least three sides) cutting mechanism 210. With this configuration, activation of actuator 212 may cause mechanism 210 to rotate and sever the reinforcement. Cover 216 may protect against unintentional contact with a cutting edge of mechanism 210.

In the disclosed embodiment, mechanism 210 is a polygonal blade having vertices that provide a sawing function (e.g., intermittent engagement of a cutting edge) against the reinforcement. It has been found that too few vertices cause the blade to dull quickly, while too many vertices reduce a biting action and/or depth of the blade. In the disclosed embodiment, the blade has 5-30 (e.g., 12-24) vertices. It is contemplated, however, that mechanism 210 could alternatively be a circular blade that functions purely by slicing, if desired. It is further contemplated that actuator 212 may be configured to affect a different or additional motion (e.g., a vibration, a side-to-side translation, alternating rotational directions between cuts, etc.) of mechanism 210 to improve severing and/or extend a life of mechanism 210, if desired.

An exemplary module 58 is illustrated in FIGS. 27 and 28. As shown in these figures, module 58 may be fabricated from at least three subassemblies. These subassemblies include a pre-compaction assembly 218, a primary compaction/curing assembly 220, and a trailing curing assembly 222. As will be explained in more detail below, each of these subassemblies may be connected to each other to form module 58 and move together to compact and cure the material discharging from module 52. For example, assembly 220 may be rigidly mounted to assembly 222 via one or more fasteners 224, and assembly 218 may be pivotally mounted to a side of assembly 220 opposite assembly 218 via one or more (e.g., two) pins 226. A spring 228 may extend between assemblies 218 and 220 to bias assembly 218 against the discharging material.

Figure 29:
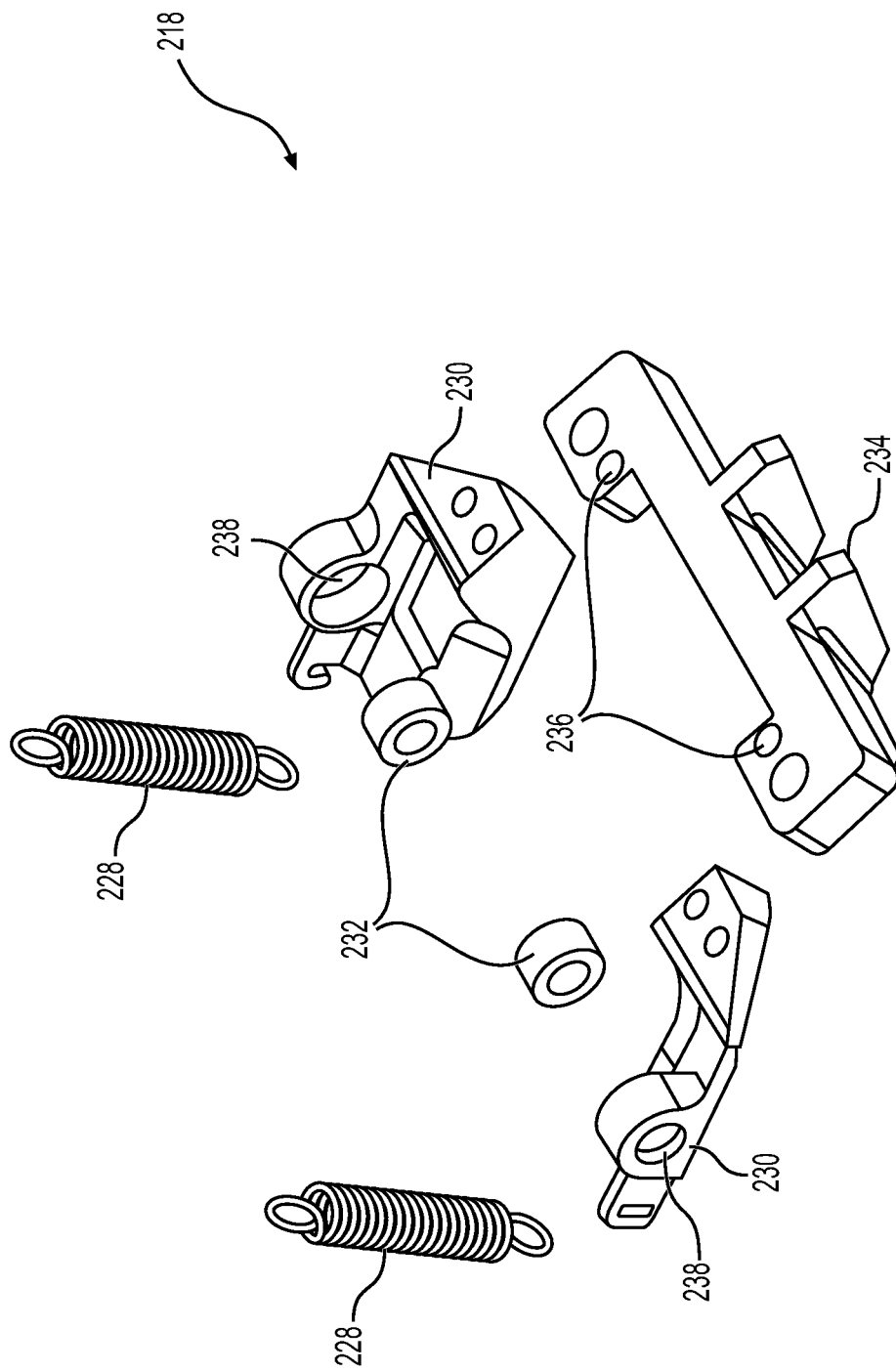
FIG. 29 is an exploded view illustration of a subassembly of the compacting/during module from FIGS. 27 and 28.

Assembly 218 may be the first subassembly of module 58 to condition the material discharging from module 52. As shown in FIG. 29, assembly 218 may include, among other things, pivoting end brackets 230 that mount to pins 226 of assembly 220 via respective bearings 232, a conditioner 234, and springs 228. Conditioner 234 may extend laterally across leading ends of brackets 230 and be held in place by one or more fasteners 236. Springs 228 may engage ends (e.g., trailing ends) of brackets 230. Bearings 232 may mount inside corresponding bores 238 located midway between the leading and trailing ends of brackets 230. In one example shown in FIG. 29, conditioner 234 is a wiper fabricated from a low-friction material (e.g., PTFE). In another example shown in FIGS. 27 and 28, conditioner 234 is a roller. It is contemplated that both a roller and a wiper could be utilized together within assembly 218, if desired. Assembly 218 (i.e., conditioner 234), in addition to providing a first level of compaction, may additionally shield the matrix coated reinforcement from cure energy transmitted by downstream components that will be discussed in more detail below.

It should be noted that, while assembly 218 is shown as a pre-compactor, it is contemplated that assembly 218 or an additional assembly 218 could alternatively or additionally be located downstream of assembly 220. For example, the only or the additional assembly 218 could be located between assembly 220 and assembly 222 (e.g., in a mirrored arrangement to the pre-compactor configuration) to function as a post-compactor or wiper, if desired.

Figure 30:
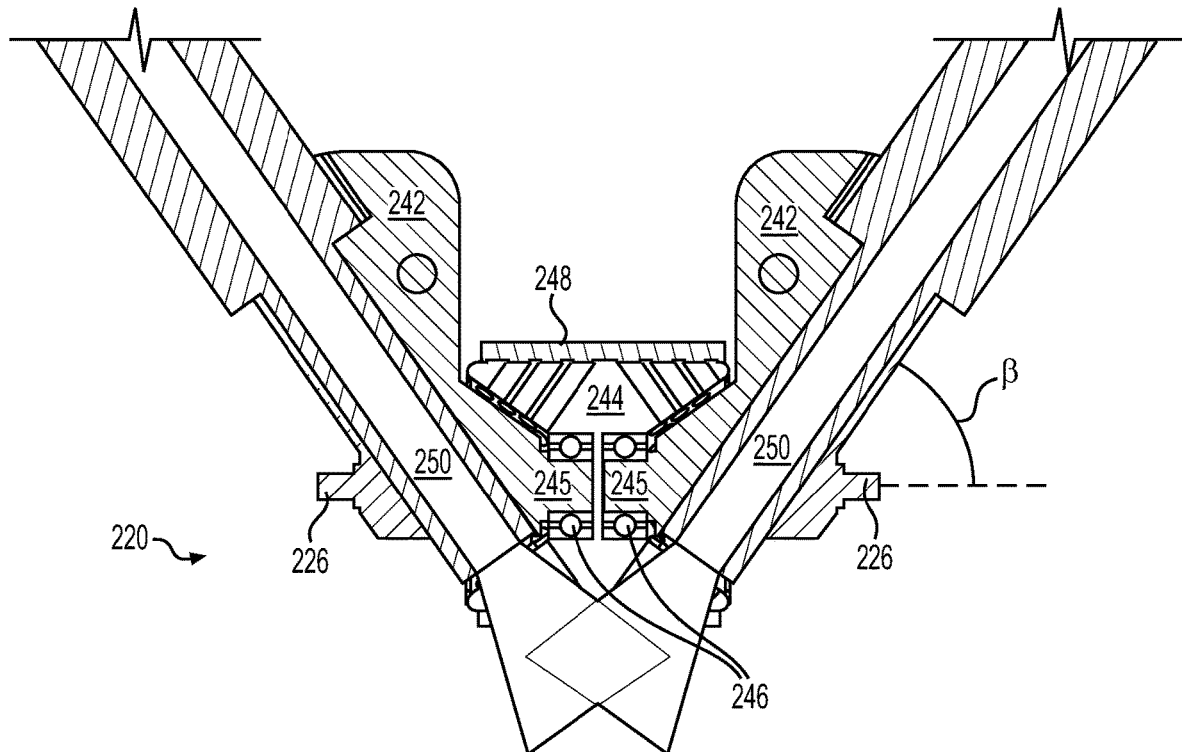
FIGS. 30 and 31 are cross-sectional and exploded view illustrations, respectively, of an additional subassembly of the compacting/curing module from FIGS. 27 and 28.
Figure 31:
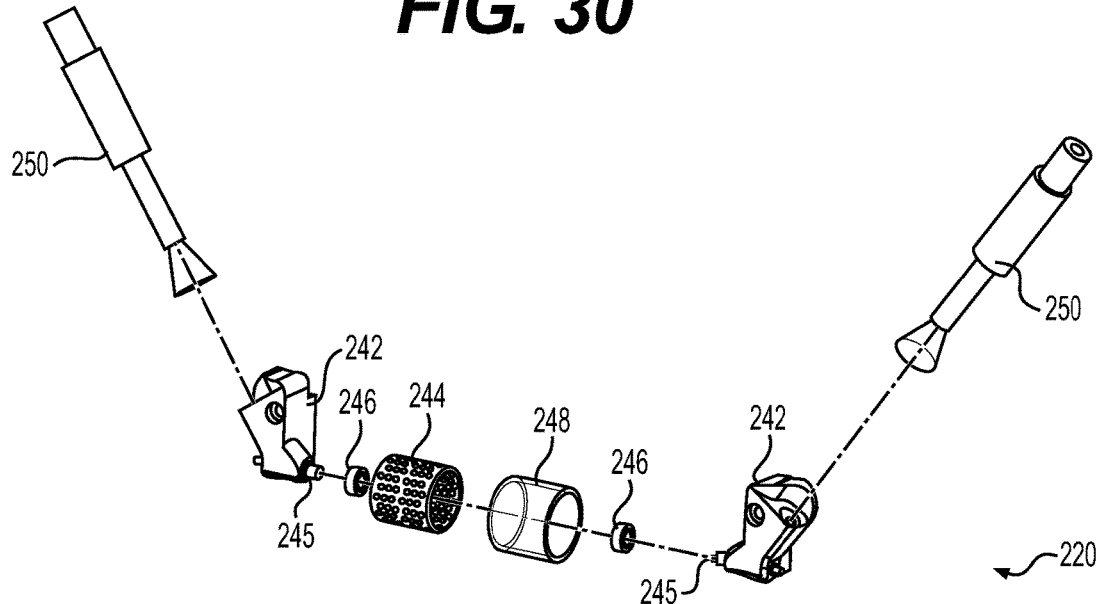

Assembly 220 may include components that cooperate to further compact the discharging material, while in some applications also triggering some curing of the matrix. In one embodiment, assembly 220 may provide about 4-5 times as much compaction as assembly 218. For example, assembly 218 may provide about 0.75-1.0 N (e.g., 0.9 N) of compaction, while assembly 220 may provide about 4.0-5.0 N (e.g., 4.4 N) of compaction. As shown in FIGS. 30 and 31, the components of assembly 220 include, among other things, a pair of oppositely arranged roller mounts 242, a roller 244 mounted to inwardly extending stub shafts 245 of mounts 242 via a pair of corresponding bearings 246, a cover 248 received over an annular surface of roller 244, and one or more (e.g., two) energy transmitters 250 that extend between one or more (e.g., the same or different) distal energy sources (e.g., sources that can be activated simultaneously or independently—not shown) and roller 244.

Roller mounts 242 may be mirrored opposites of each other, each having an outer bracket end for mounting assembly 220 to assembly 222, and stub shaft 245 extending inwardly towards each other from the bracket ends. Bearings 246 may be pressed onto stub shafts 245. Pins 226 may be generally coaxial with stub shafts 245 and protrude outward from the bracket ends of roller mounts 242. A passage may be formed within each of roller mounts 242 to receive a corresponding transmitter 250. The passage may extend at an oblique angle β from the outer bracket end of mount 242 axially inward and toward the material being passed over by roller 244. In one embodiment, the angle β of each passage and transmitters 250 may be about 30-90° (e.g., 30-65°). The angle β may help to focus the energy from transmitters 250 axially inward toward a general center of roller 244 and to the material being passed over by roller 244. The angle β may also help cure both a top surface and a side edge of the material at the same time. In some applications, the passages and transmitters 250 may additionally or alternatively be tilted forward at an oblique angle δ (i.e., such that the energy from transmitters 250 is directed toward assembly 222 and away from assembly 218—see FIG. 28). In one embodiment, the angle δ of the passages and transmitters 250 may be about 0-30°. The angle δ may help to focus the energy from transmitters 250 at or downstream of a nip point of roller 244 to avoid premature curing at a location not yet passed over by roller 244.

Figure 33:
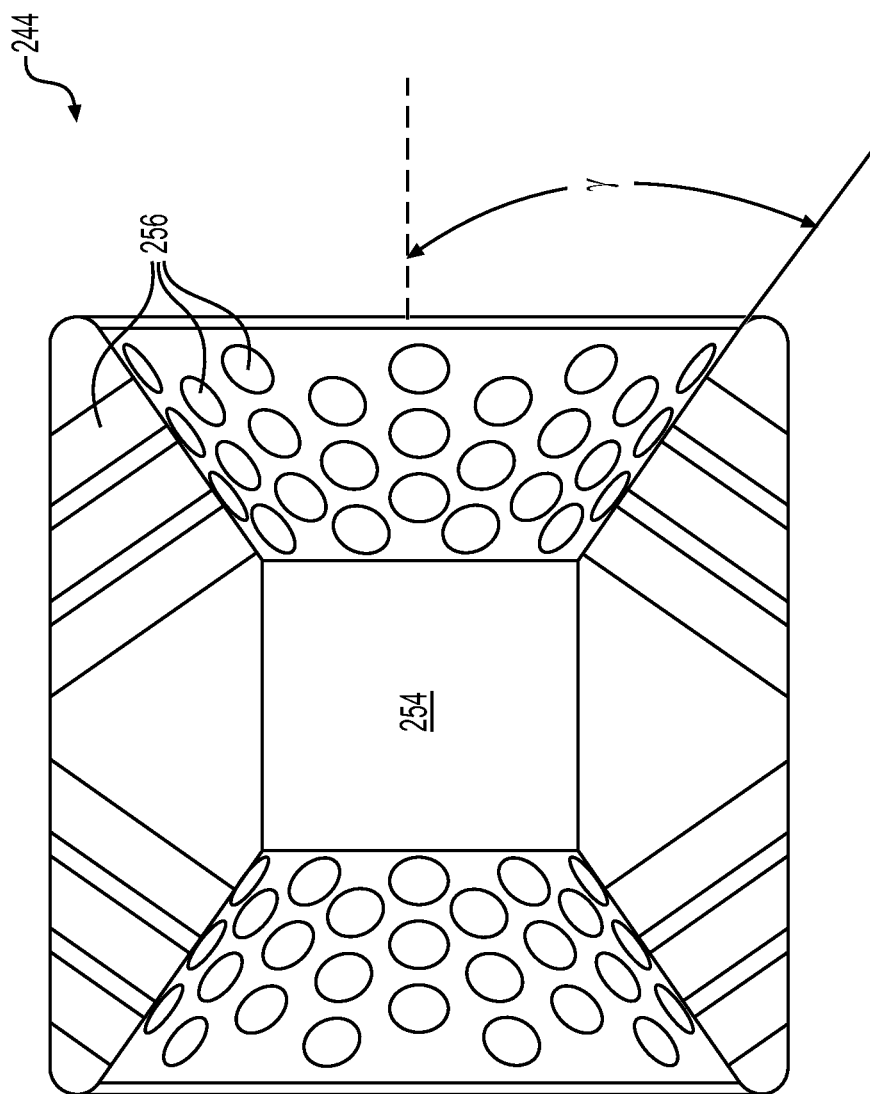
FIGS. 32 and 33 are diagrammatic and cross-sectional illustrations, respectively, of a portion of the subassembly of FIGS. 30 and 31.
Figure 32:
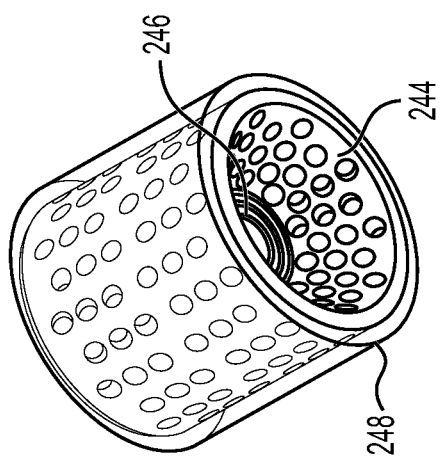

Roller 244 may have unique geometry to facilitate simultaneous compaction and curing of the material being passed over by assembly 220. As shown in FIGS. 32 and 33, roller 244 may be generally cylindrical, having a center bore 254 formed therein to receive bearings 246 (shown only in FIG. 31). Center bore 254, at each axial end of roller 246, may taper radially inward at an angle γ toward an outer edge of bearings 246. In one embodiment, angle γ may be about 10-20° (e.g., 15°) and oriented generally orthogonal to the axes of transmitters 250 (referring to FIGS. 30 and 31). A plurality of energy channels 256 may extend from the tapered surfaces of center bore 254 radially outward through an outer annular surface of roller 244. Channels 256 may generally be aligned or parallel with the axes of passages 252 and transmitters 250, such that energy may flow from transmitters 250 through channels 256 with little, if any, obstruction.

In the depicted embodiment, channels 256 are about 1.0-1.5 mm in diameter (e.g., 1.125 mm) and spaced about 1.25-1.75 mm (e.g., 1.5 mm) axis-to-axis. Three channels 256 are formed at each radial spoke of the tapered regions, with the axial locations being staggered between adjacent radial spokes to allow tighter nesting between adjacent channels 256. There are twenty spokes around the circumference of roller 244 in the embodiment of FIGS. 32 and 33.

It is contemplated that roller 244 could have a simpler form, in some applications. For example, roller 244 could be fabricated from an energy-transparent material. In these applications, because the energy from transmitters 250 may pass substantially uninterrupted through roller 244, channels 256 may be omitted. Other configurations are also possible.

Cover 248 may be press fit over roller 244 and perform multiple functions. In one example, cover 248 provides a generally solid surface passing over the discharging material. This may reduce a likelihood of the material picking up a pattern from roller 244 and inhibit ingress of the material (e.g., of the matrix). In another example, cover 248 may provide a low-friction surface that reduces a likelihood of the matrix sticking to assembly 220. In yet another example, cover 248 may help to diffuse or distribute some of the energy passing from transmitters 250 through roller 244 at a surface of the material being compacted and cured. Finally, cover 248 may be an inexpensive and easily replaceable wear component that limits wear of the more permanent and expensive roller 244.

Figure 36:
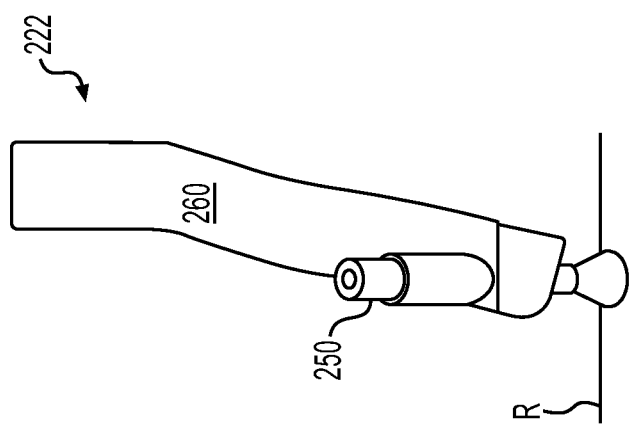
FIGS. 34, 35 and 36 are diagrammatic illustrations of another subassembly of FIGS. 30 and 31.
Figure 35:
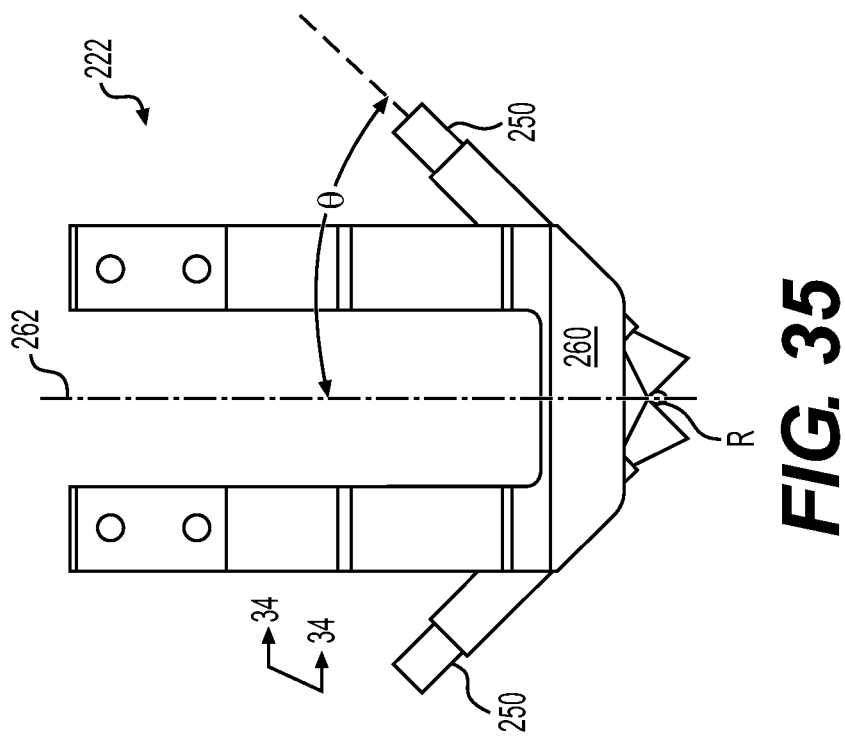
Figure 34:
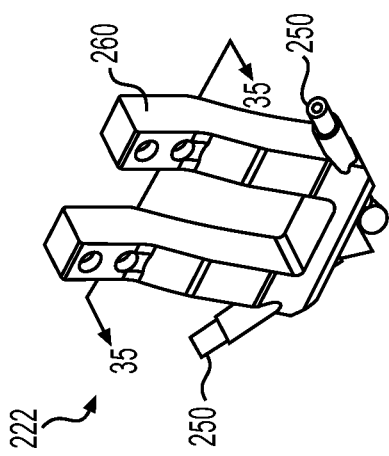

Assembly 222 may include components that cooperate to further cure the discharging material. In one embodiment, assembly 222 is configured to through-cure or complete curing of the matrix that was only triggered by assembly 220. As shown in FIGS. 34-36, assembly 222 may include, among other things, a bracket 260 to which one or more energy transmitters 250 may be connected. In the disclosed embodiment, two energy transmitters 250 are shown as arranged in mirrored opposition to each other. Energy transmitters 250 may be the same identical transmitters used in assembly 220 or different, as desired. Tips of transmitters 250 of assembly 222 may be tilted inward at an angle θ relative to a symmetry plane 262 that passes through the reinforcement R during operation of head 16. In the disclosed embodiment, angle θ may be about 0-120°. It is also contemplated that the tips of transmitters 250 may additionally or alternatively be tilted in the fore-aft direction along plane 262, if desired. Tilting of transmitters 250 toward assembly 220 may allow for curing closer to the nip point of roller 244, which may increase an accuracy in reinforcement placement.

Bracket 260 may be generally U-shaped. Legs of the U-shape may be used to mount assembly 222 to the rest of head 16. An empty space between the legs, as will be explained in more detail below, may provide clearance for module 56 (e.g., for actuators 212 and 272).

Figure 38:
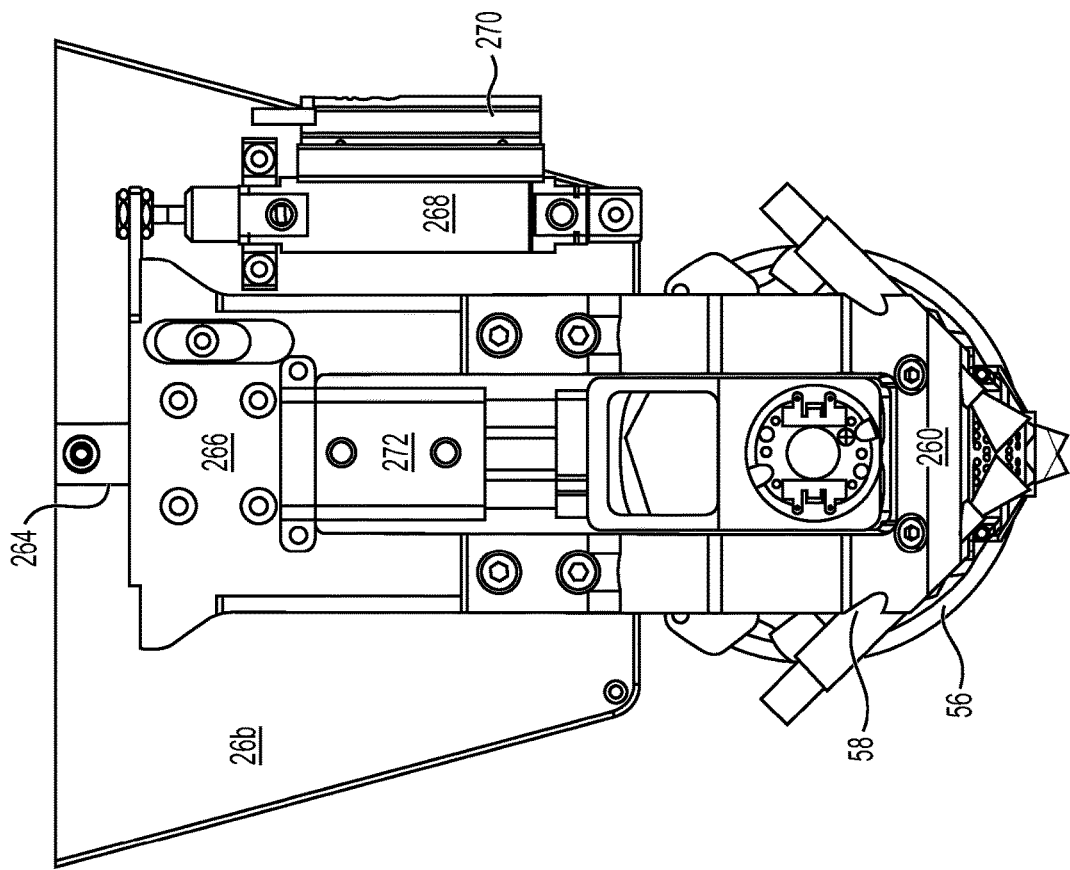
FIGS. 37 and 38 are diagrammatic illustrations of a motion platform for the cutting and compacting/curing modules from FIGS. 25-28.
Figure 37:
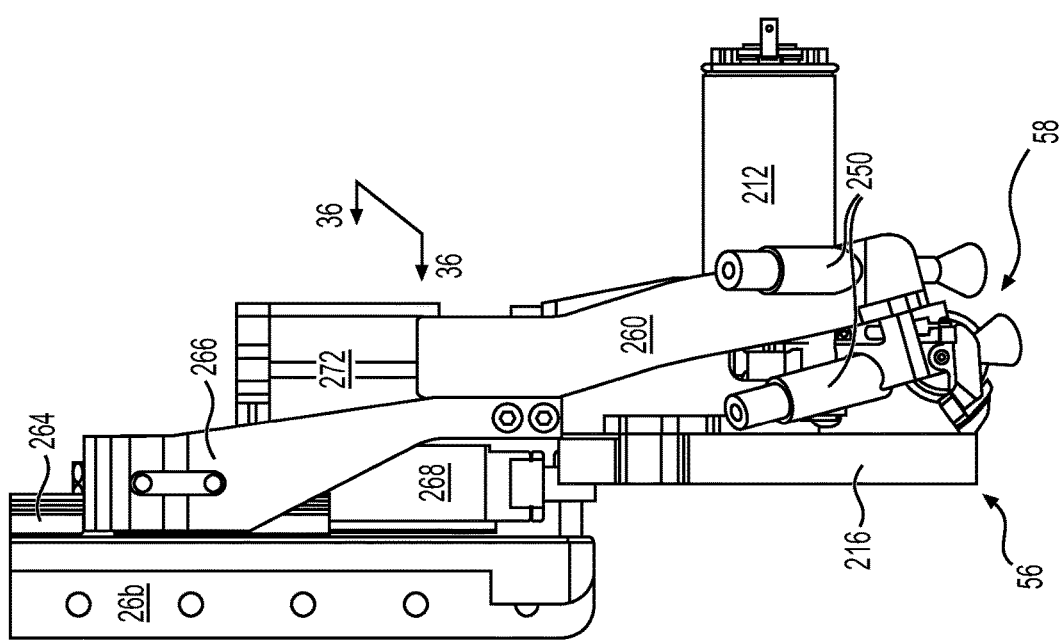

As shown in FIGS. 37 and 38, modules 56 and 58 may be configured to move together relative to the rest of head 16. For example, a rail 264 may be affixed to a gusset 26b that forms a part of plate 26 and oriented vertically relative to the perspective of FIGS. 37 and 38. In one embodiment, an axis of rail 264 may be generally parallel (e.g., collinear) with an axis of drive 18 and/or a final rotation joint of support 14 (referring to FIG. 1). Each of modules 56 and 58 may be connected to a common carriage 266 that is configured to slide and/or roll along rail 264 in the vertical direction, and one or more linear actuators 268 may be connected to translate carriage 266 and modules 56, 58 together along rail 264. In one embodiment, actuator(s) 268 are directly connected to a first end of carriage 266, and modules 56 and 58 are separately connected to an opposing end of carriage 266 (e.g., via hardware 214 and bracket 260, respectively).

In embodiments where two actuators 268 are implemented, the actuators may be located at opposing lateral sides of carriage 266. In these embodiments, it is contemplated that actuators 268 may both exert forces on modules 56 and 58 in the same direction (e.g., both functioning to raise or lower the modules) or that the actuators could function in opposition to each other. When arranged to function in opposition to each other, greater control over motion of the modules may be obtained.

It should be noted that other mounting configurations for modules 56 and 58 are also possible. For example, modules 56 and 58 could be mounted to move completely independently of each other. That is, module 58 could be connected to gusset 26b via carriage 266 and actuator 268, while module 56 could be connected to gusset 26b via a separate carriage and/or separate actuator.

During extension and retraction of actuator 268, modules 56 and 58 may be moved away from or toward a surface formed from the material being extruded by head 16. In some applications, it may be useful to know a location of modules 56 and/or 58 during this motion. For this reason, a sensor 270 may be positioned (e.g., mounted to gusset 26b or actuator 268) to detect the location. In the disclosed embodiment, sensor 270 may be associated with actuator 268 and configured to detect a position of a portion of actuator 268.

Module 56 may also be configured to selectively move relative to module 58. For example, an additional actuator 272 may extend between carriage 266 and module 56 and be configured to selectively extend module 56 further in the axial direction of rail 264.

In the disclosed embodiment, two different cure sources 274 (e.g., light sources, such as U.V. lights or lasers—shown in FIG. 23) direct cure energy through transmitters 250. Transmitters 250 may be designed with sufficient length and slack to accommodate the relative motions described above that are initiated by actuators 268 and 272. In one example, the linear motion initiated by actuator 268 is 5-15 mm (e.g., 10 mm), the linear motion initiated by actuator 272 is 5-15 mm (e.g., 10 mm), and the length of each transmitter 250 is selected to be 10-15% longer or about 40 mm longer than strictly necessary to make the connections. This extra length may help to ensure adequate flexing.

Figure 39:
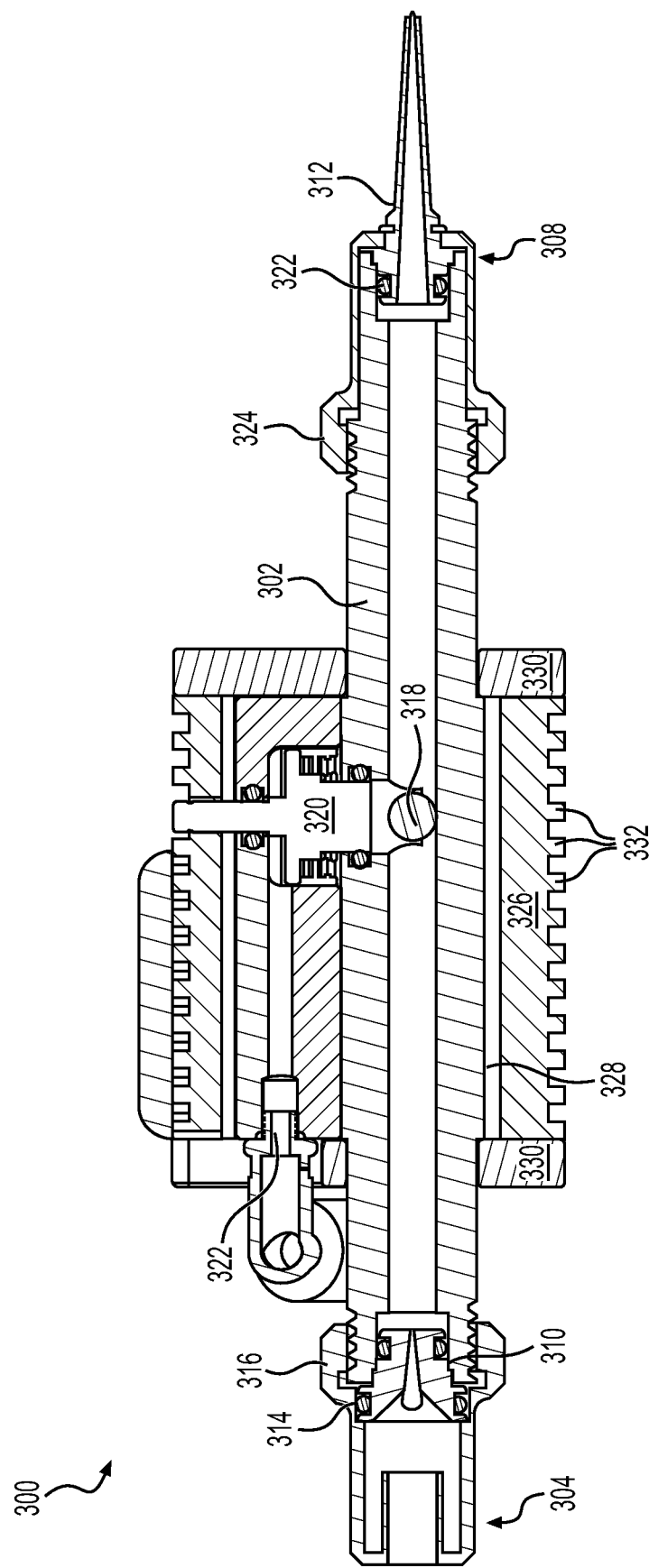
FIG. 39 is a cross-sectional illustration of another exemplary wetting module for the print head of FIGS. 2-5.
Figure 40:
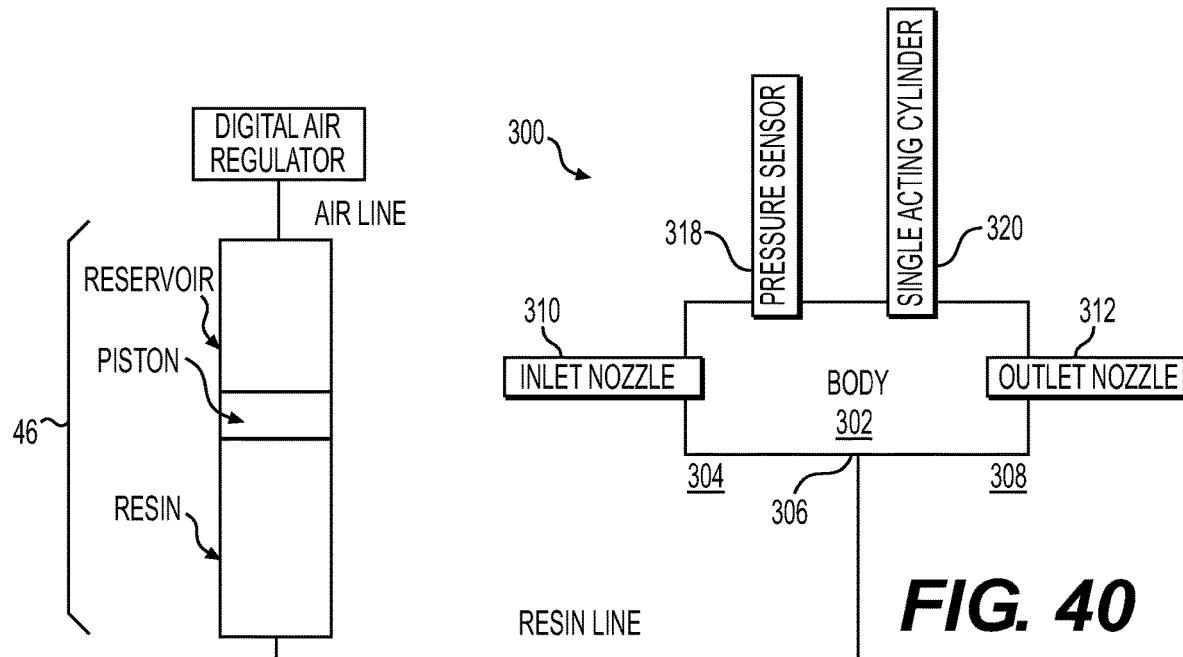
FIGS. 40 and 41 are diagrammatic illustrations for the wetting module of FIG. 39.
Figure 41:
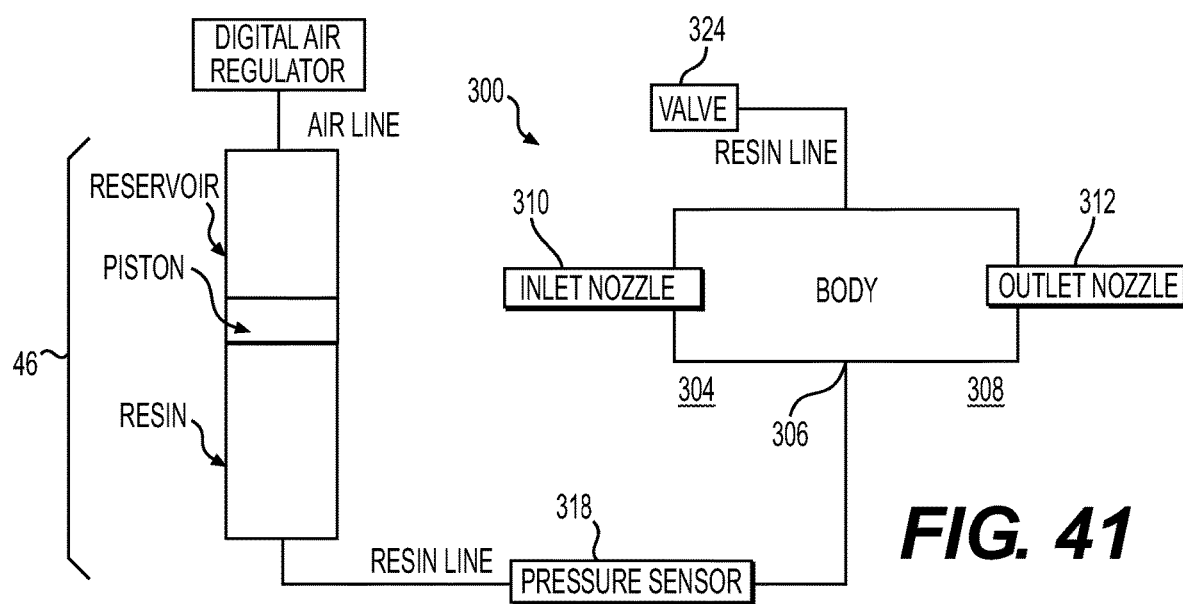

An alternative wetting module 300 is illustrated in FIGS. 39, 40 and 41. As can be seen in these figures, module 300 may include a tubular body 302 having a fiber inlet 304 configured to receive reinforcement from module 50, a matrix inlet 306 (shown only in FIGS. 40 and 41) configured to receive matrix from module 46, and a composite outlet 308 configured to discharge matrix-wetted reinforcements toward module 58. A first nozzle 310 may be removably connected to fiber inlet 304, and a second nozzle 312 may be removably connected to composite outlet 308. In some embodiments, a heater (not shown) may be associated with body 302 and disposed between fiber inlet 304 and composite outlet 308 (e.g., closer to fiber inlet 304).

Reinforcement entering module 300 may pass first through nozzle 310. In one embodiment, nozzle 310 has a cross-sectional (e.g., rectangular) shape substantially matching a cross-sectional shape of the reinforcement. As shown in FIG. 39, an area of the cross-section may taper from a larger upstream end to a smaller downstream end. This tapering may facilitate threading of the reinforcement through nozzle 310. The area of the downstream cross-section may be selected to be just larger than a cross-sectional area of the reinforcement. In one embodiment, the downstream cross-sectional area of nozzle 310 may be 0-60% (e.g., 0-30%) greater than the cross-sectional area of the reinforcement. A seal 314 may be disposed annularly between an outer surface of nozzle 310 and an inner surface of body 302, and a fastener (e.g., a nut) 316 may be used to press nozzle 310 against body 302. Body 302 may include one or more clocking features (e.g., flat lands) that engage one or more clocking features (e.g., flat lands) of nozzle 310, such that body 302 and nozzle 310 (and the reinforcement passing through nozzle 310) may be oriented in a desired manner relative to each other.

Pressurized matrix may be directed into body 302 at the same time that the reinforcement is discharging from nozzle 310 into body 302. The matrix may infiltrate and at least partially wet (e.g., fully saturate) the reinforcement prior to the reinforcement reaching nozzle 312.

In some applications, infiltration and/or saturation of the reinforcement with the matrix may be controlled via regulation of the pressure of the matrix inside of body 302. A pressure sensor 318 may be selectively employed by controller 20 to help regulate operation of module 300. In the embodiment of FIGS. 39 and 40, sensor 318 is mounted directly to body 302 to generate signals indicative of pressures therein. In the embodiment of FIG. 41, sensor 318 is instead connected to a conduit extending from module 46 to body 302. The location of sensor 318 of FIGS. 39 and 40 may allow for more precise pressure control, while the location of FIG. 41 may allow for a smaller form factor of module 300. In either configuration, controller 20 may selectively adjust operation of module 46 based on signals from sensor 318.

In some applications, a responsiveness of module 46 to adjust pressures inside module 300 based on signals generated by sensor 318 may be delayed longer than desired. This delayed adjustment could result in undesired leaking of matrix from module 300 or insufficient wetting of the reinforcement.

One way to improve pressure control within module 300 is illustrated in FIGS. 39 and 40. This may include employment of a cylinder 320. Cylinder 320 may be a double-acting cylinder that is actively controlled to move in opposing directions or a single-acting cylinder that is actively controlled to move in only a single direction (e.g., a pressure increasing direction) and passively allowed to return in an opposing direction based on an imbalance of forces. Although shown in FIG. 39 as being pneumatically controlled (e.g., via a connection 322 to pressurized air), it is contemplated that cylinder 320 could alternatively be electronically controlled, hydraulically controlled, mechanically controlled, or controlled in a combination of these and other ways.

Cylinder 320 may be selectively moved (e.g., controlled to move or only allowed to move) to rapidly increase or decrease an effective volume of module 300. For example, cylinder 320 may be moved away from body 302 to increase the volume or moved toward body 302 to decrease the volume. An increase in volume for a given amount of matrix may result in a lower pressure inside of body 302. In contrast, a decrease in volume for the given amount of matrix may result in a greater pressure inside of body 302.

During normal operation, cylinder 320 may be moved to decrease the volume of module 300 at the start of, during, and/or shortly after a feed event, and moved to increase the volume at or near an event at which feeding of the reinforcement slows or stops (e.g., at or near a cut event). The volume-decreasing and/or volume-increasing motions of cylinder 320 may be coordinated with similar increasing and/or decreasing changes in air supplied to module 46, but the effect of cylinder 320 may be experienced much quicker.

Another way to improve pressure control within module 300 is illustrated in FIG. 41. This may include employment of a valve 324 connected to a low-pressure environment (e.g., a chamber—not shown). In one example, valve 324 may embody a flexible tube, a restriction of which can be selectively adjusted (e.g., via deforming, clamping, releasing, etc.). Valve 324 may normally be held closed during payout of the reinforcement from module 300. When payout stops, valve 324 may be caused to open, allowing the pressurized matrix in nozzle body 302 to flow therethrough instead of dripping out module 300. Thereafter, valve 324 may be closed again, once payout restarts.

The reinforcement wetted with matrix (i.e., the composite material) may be discharged from body 302 through nozzle 312. Like nozzle 314, nozzle 312 may also have a cross-sectional (e.g., rectangular) shape substantially matching the cross-sectional shape of the reinforcement. An area of the cross-section may taper from a larger upstream end to a smaller downstream end to facilitate threading of the reinforcement through nozzle 312. The area of the downstream cross-section may be selected to be larger than a cross-sectional area of the reinforcement, such that a desired amount of matrix clinging to the reinforcement may pass through the downstream cross-section. In the embodiment illustrated in FIG. 39, the downstream cross-sectional area of nozzle 312 may be 0-150% (e.g., 0-120%) greater than the cross-sectional area of the reinforcement. A seal 322 may be disposed annularly between an outer surface of nozzle 312 and an inner surface of body 302, and a fastener (e.g., a nut) 324 may be used to press nozzle 312 into body 302. Body 302 may include one or more clocking features (e.g., flat lands) that engage one or more clocking features (e.g., flat lands) of nozzle 312, such that body 302, nozzle 312, and nozzle 314 (and the reinforcement passing through nozzles 312 and 314) may be oriented in a desired manner relative to each other.

Body 302 may be operably mounted to plate 26 (referring to FIGS. 2-5) in a thermally isolating manner. For example, a mounting block 326 may be placed annularly around body 302, with an air gap 328 located therebetween. A pair of axially spaced-apart mounting plates 330 may extend radially from body 302 outward through air gap 328 and connect to opposing ends of mounting block 326. Fins or other heat transferring components 332 may extend from mounting block 326 to dissipate any excess heat that happens to pass through air gap 328 into the air before the heat can be transferred into primary plate 26a.

Figure 42:
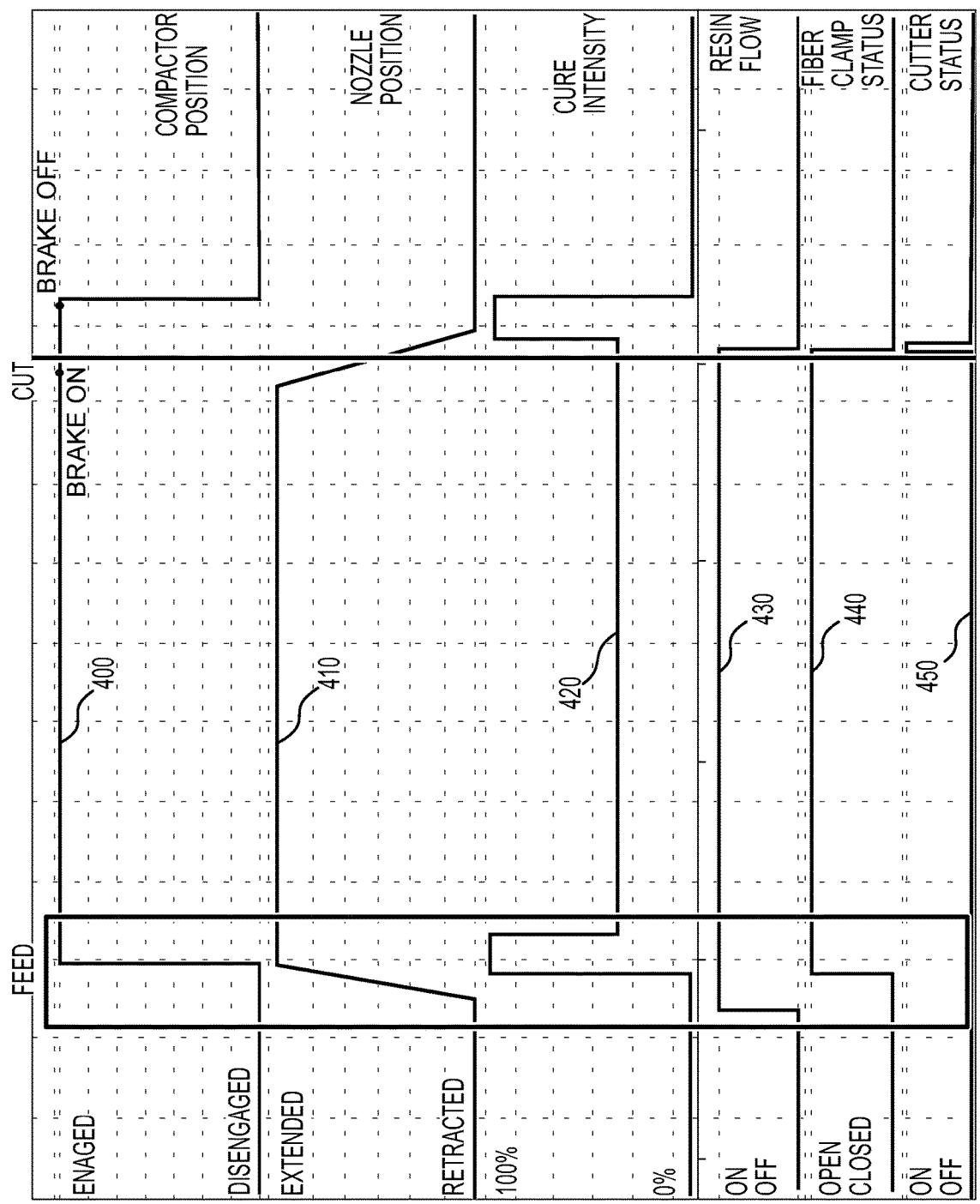
FIG. 42 is a control chart that may be used in conjunction with the print head of FIGS. 2-5.
Figure 43:
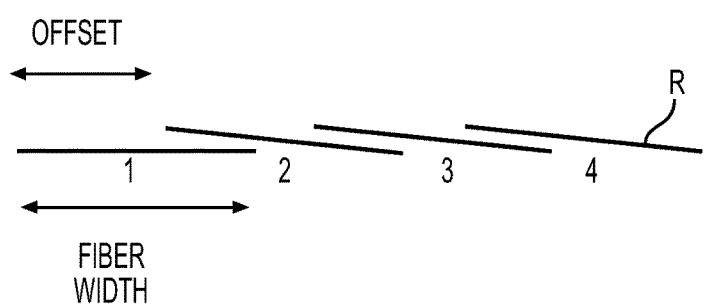
FIGS. 43 and 44 are diagrammatic illustrations of a structure fabricated via the system of FIG. 1.
Figure 44:
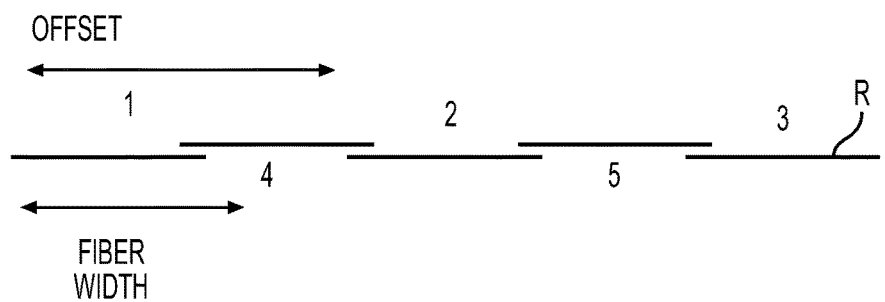

FIGS. 42-44 illustrate different operations of system 10. These figures will be discussed in more detail below to further illustrate the disclosed concepts.

INDUSTRIAL APPLICABILITY

The disclosed system and print head may be used to manufacture composite structures having any desired cross-sectional size, shape, length, density, and/or strength. The composite structures may include any number of different reinforcements of the same or different types, diameters, shapes, configurations, and consists, each coated with a common matrix. Operation of system 10 will now be described in detail with reference to FIGS. 1-44.

At a start of a manufacturing event, information regarding a desired structure 12 may be loaded into system 10 (e.g., into controller 20 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplers, tees, splices, etc.), location-specific matrix stipulations, location-specific reinforcement stipulations, compaction requirements, curing requirements, etc. It should be noted that this information may alternatively or additionally be loaded into system 10 at different times and/or continuously during the manufacturing event, if desired.

Based on the component information, one or more different reinforcements and/or matrixes may be selectively loaded into head 16. For example, one or more supplies of reinforcement may be loaded onto creel 19 (referring to FIGS. 1-5) of module 44, and one or more cartridges 110 of matrix may be placed into module 46.

The reinforcements may then be threaded through head 16 prior to start of the manufacturing event. Threading may include passing the reinforcement from module 44 around redirects 102 of module 48 and through module 50. The reinforcement may then be threaded through module 52 and wetted with matrix. Module 52 may then extend to place the wetted reinforcement under module 58. Module 58 may thereafter press the wetted reinforcement against an underlying layer. After threading is complete, head 16 may be ready to discharge matrix-coated reinforcements.

At a start of a discharging event, cure sources 274 (referring to FIG. 23) may be activated, module 50 may be deactivated to release the reinforcement, and head 16 may be moved away from a point of anchor to cause the reinforcement to be pulled out of head 16 and at least partially cured. This may continue until discharge is complete and/or until head 16 must move to another location without discharging material during the move.

As head 16 nears an end of a discharge path, head 16 may be controlled to stop. At this location, motion of head 16 may stop, and sources 274 may be deactivated. Module 52 may be moved to its retracted position, module 50 may be activated to clamp the reinforcement, and module 56 may be activated and extended to sever the reinforcement. Module 56 may then be deactivated and retracted. Sources 274 may be reactivated, and head 16 may be moved to complete the discharge path. Head 16 may then be moved to a start location of a next discharge path, during which time module 58 may be retracted.

During discharge of the wetted reinforcements from head 16, module 58 may roll and/or slide over the reinforcements. A pressure may be applied against the reinforcements by subassemblies 218 and/or 220, thereby compacting and/or wiping the material. Sources 274 may remain active during material discharge from head 16 and during compacting, such that at least a portion of the material is cured and hardened enough to remain tacked to the underlying layer and/or to maintain its discharged shape and location. In some embodiments, a majority (e.g., all) of the matrix may be cured by exposure to energy from source 274.

It should be noted that the amount of cure energy generated by module 58 may be variable. For example, the energy could be generated at levels that are related to other parameters (e.g., travel speed) of head 16. For instance, as the travel speed of head 16 increases and the discharge rate of reinforcement from head 16 proportionally increases, the amount of energy generated by module 58 and directed toward the discharging material may likewise increase. This may allow a consistent unit of energy to be received by the matrix coating the reinforcement under a range of conditions. It is also possible that a greater unit of energy may be received during particular conditions (e.g., during anchoring, during free-space printing, at particular geometric locations of structure 12, etc.), if desired. Each of sources 274 may be independently activated, activated in pairs (e.g., leading sources, trailing sources), or activated simultaneously in a cooperative manner.

The component information may be used to control operation of system 10. For example, the reinforcements may be discharged from head 16 (along with the matrix), while support 14 selectively moves head 16 in a desired manner during curing, such that an axis of the resulting structure 12 follows a desired trajectory (e.g., a free-space, unsupported, 3-D trajectory). In addition, module 46 may be carefully regulated by controller 20 such that the reinforcement is wetted with a precise and desired amount of the matrix. For example, based on signals generated by sensor 104 (referring to FIG. 8) that are indicative of a feed rate of the reinforcement through head 16, controller 20 may selectively increase or decrease a speed of module 46 to provide a corresponding feed rate of matrix to module 52. This feed rate of matrix may be trimmed, in some embodiments, based on signals from sensor 180/318. In this way, regardless of the travel speed of head 16, a desired ratio of matrix-to-reinforcement may always be maintained.

As discussed above, during payout of matrix-wetted reinforcement from head 16, modules 44 and 48 may together function to maintain a desired level of tension within the reinforcement. It should be noted that the level of tension could be variable, in some applications. For example, the tension level could be lower during anchoring and/or shortly thereafter to inhibit pulling of the reinforcement during a time when adhesion may be lower. The tension level could be reduced in preparation for severing and/or during a time between material discharge. Higher levels of tension may be desirable during free-space printing to increase stability in the discharged material. Other reasons for varying the tension levels may also be possible. The level of tension may be adjusted via threshold adjustments associated with when actuator 74 is turned on/off and/or what speeds and/or torques are applied by actuator 74 in response to signals from sensor 104.

FIG. 42 illustrates an exemplary way to regulate compaction forces, tension, cure energy, resin flow, and/or other parameters during various operations. These operations may include, for example, a feeding operation and cutting operation. The feeding operation may be instituted at a start of a fabrication event, while a cutting operation may be instituted at an end of the event.

As can be seen in a first trace 400 shown in FIG. 42, module 58 (including sub-assemblie(s) 218 and/or 220) may be disengaged (e.g., away from a print surface) at beginning of the feeding operation. This may allow the matrix-coated reinforcement to be placed at a desired location without interference from any associated roller 244 and/or other conditioner 234. At this same time, as shown in a second trace 410, module 56 may still be in its retracted position due to a previously completed cut. A third trace 420 shows that cure sources 274 may be turned off at this time; a fourth trace 430 shows that matrix flow from module 46 into module 52 may be on; a fifth trace 440 shows that the reinforcement may be clamped; and a sixth trace 450 shows that module 56 may be off.

To feed the reinforcement and begin fabrication of structure 12, module 50 may be activated to close onto a clamp the reinforcement. Thereafter, module 52 may be extended to push a tag end of the reinforcement that protrudes from nozzle 168D (referring to FIG. 16) to a location under roller 244 and/or conditioner 234 (i.e., between module 58 and the print surface). Module 58 may be activated to move toward the material and exert pressure against the tag end; the flow of resin may be turned on; sources 274 may be activated; and the reinforcement may be released (i.e., allow to move unhindered by module 50. Support 14 may then move head 16 along a predefined trajectory, thereby causing the matrix-wetted fiber to be pulled through system 10 and deposited at a desired location within/on structure 12.

It should be noted that stiction may be present within module 58, in some embodiments. In these embodiments, an initial higher force may be commanded of module 58 to overcome that stiction and ensure movement of module 58 at the right timing and with the correct force. After this initial motion, as can be seen from trace 400, the force commanded of module 58 may then be reduced to a lower level for normal payout operations.

In some applications, the above-described extension of the reinforcement during the feeding operation may place a tag end of the reinforcement past a nip point of roller 244, such that activation of sources 274 during the feed routine cause the tag end to adhere to the underlying surface. While this may be sufficient to anchor the reinforcement and allow motion of head 16 away from the anchor to pull additional reinforcement out of head 16, this tension could be high enough to dislodge the tag end from the anchor. In order to provide additional time for the anchor to cure and securely adhere the tag end, it may be helpful to reduce tension acting on the tag end. This tension may be reduced, for example, by causing additional extension towards module 58 during initial motion of head 16 away from the anchor. The tension may be reduced to about zero, as long as the extending motion of module 52 offsets the motion of head 16.

Modules 50-58 may remain in their current states during material deposition, although some adjustments within their states may be possible. For example, module 50 may remain deactivated to allow for unhindered discharge of the reinforcement. Module 52 may remain extended, such a point of discharge is located as close as possible to the nip point of module 58—this may reduce undesired wandering of the reinforcement. Module 56 may be held away from the reinforcement, and module 58 may continue to compact and cure the discharging material. It should be noted, however that a pressure of the compaction and/or an intensity of the cure energy could be selectively adjusted (e.g., based on geometry, desired properties, etc.) during this time, if desired. For example, the cure energy intensity could be temporarily boosted during the feed operation to ensure a strong tack of the fiber, and thereafter reduced during continued discharging to conserve energy, reduce wear of sources 274, and/or provide a desired level of cure.

Upon nearing an end of a path of printed material, severing of the reinforcement may be required so that head 16 can be repositioned to the start location of a new path (i.e., without causing the reinforcement to be inadvertently pulled from head 16). To initiate the cutting operation, module 52 may need to be retracted away from module 58 and thereby provide clearance for module 56 to move therebetween and slice through the reinforcement. Resin flow may be stopped to reduce leakage, and the reinforcement may be clamped to inhibit undesired pull back from module 48. Module 56 may then be activated to sever the reinforcement, and then immediately withdrawn back to its stowed position.

Although not shown in FIG. 42, note that operation of low-pressure pump 181 may be initiated anytime resin flow is stopped, to inhibit resin leakage from module 52. In other words, a trace illustrating operation of low-pressure pump 181 may be the inverse of trace 430 shown in FIG. 42.

After the reinforcement is severed, module 58 may be disengaged from the material and module 50 may release the reinforcement in preparation for a next feeding operation. It should be noted that engagement of module 58 during severing may aid in the severing by holding the reinforcement taut as the blade of module 56 passes therethrough.

In some embodiments, source(s) 274 may be active and/or selectively boosted during and/or after the cutting operation. The energy exposure that occurs within this period of time may cause the severed tag end of material passing under module 58 to adhere in place and for the material end protruding from module 52 to stiffen and aid in being pushed under module 58 during the ensuing feeding operation.

In general, when tacking the reinforcement to a print surface during the feeding operation, tension within the reinforcement may be maintained at a non-zero level that is as low as possible, compaction forces may initially be high, and cure intensity may be boosted. All of these things may reduce a likelihood of the tacked material from pulling away from an underlying surface by motion of head 16. During normal payout operation (i.e., during the time between feeding and cutting), tension may be kept at a lower level, compaction forces may be maintained or reduced, and cure intensity may be reduced. The lower compaction forces may push less matrix out of the reinforcement, while the lower cure intensity may reduce the likelihood of over-curing that can cause cracking.

During the cutting operation, tension within the reinforcement may be maintained or even increased, and compaction may likewise be maintained or increased. The increased tension may improve cutting of the reinforcement. The compaction force may be needed to inhibit undesired lifting of subassemblies 218 and 220 from a surface of structure 12 caused by the increased tension and/or engagement of mechanism 210 with the reinforcement.

In some embodiments, a tension normally present within the reinforcement may naturally tend to lift module 58 away from the surface of object 12. To provide a desired level of compaction during normal payout, the force of module 58 acting toward the surface must be elevated to overcome the tension of the reinforcement. Accordingly, when the reinforcement is severed and the corresponding lifting force is eliminated, the downward compacting force of module 58 should also be reduced during payout of the severed tag end of reinforcement and prior to complete disengagement. This is illustrated as the knee shown in trace 400 just after activation of module 56 shown in trace 450.

In some embodiments, a brake may be associated with module 58 (e.g., with subassembly 218 and/or subassembly 200). For example, subassembly 220 could be connected to the rest of module 58 via a resilient member (not shown) that allows some vertical motion within a limited range relative to bracket 260 and/or carriage 266 (e.g., to accommodate inconsistencies in the print surface). In these embodiments, an increase in tension caused by engagement of mechanism 210 with the reinforcement could result in the above-described lifting of subassembly 220 by compression of the resilient member. The brake may be associated with module 58 and configured to selectively lock the position of subassembly 220 such that the resilient member does not compress or decompress during the severing event. As shown in trace 400, the brake may be activated at a start of the severing event and deactivated at conclusion of the event. This may facilitate a quicker and cleaner cutting of the reinforcement, without detrimentally affecting the print surface.

FIGS. 43 and 44 illustrate paths of material discharged sequentially by head 16 adjacent each other. In these figures, the paths each have a generally rectangular cross-section and a trajectory that is into/out of the sheet. Each trajectory is generally parallel to each other. In the embodiment shown in FIG. 43, each subsequent path of material is discharged at a location offset transversely (e.g., to the right) from a previously discharged path of material. That is, the first path of material is discharged furthest to the left in FIG. 43, and the final path of material is discharged furthest to the right. In this embodiment, the offset amount is less than a width of each path, such that each path overlaps at one edge (e.g., the left edge) with the previously discharged path of material. This may cause each path of material (i.e., other than the first path) to be tilted at an angle relative to an underlying layer. While acceptable for some applications, this may cause the resulting structure 12 to have an appearance (e.g., a ridges) and/or a performance parameter (e.g., void content) that is less than desired.

FIG. 44 illustrates an alternative way to produce structure 12 having an improved appearance and/or performance parameter. In this embodiment, the offset distance is selected to be greater than the width of each rectangular path, such that gaps are initially created between the adjacent paths discharged within a first event (e.g., during discharging of paths 1-3). During a second event (e.g., during discharge of paths 4 and 5), paths of material may then be discharged at staggered locations such that the previously produced gaps are covered with newly discharged material. The paths of material discharged during the second event are then supported at both opposing edges by the underlying material, allowing the paths of the second event to have a generally parallel orientation relative to the underlying layer. This may reduce ridges created at the edges of the paths and reduce void content.

It will be apparent to those skilled in the art that various modifications and variations can be made to the disclosed system and head. Other embodiments will be apparent to those skilled in the art from consideration of the specification and practice of the disclosed system and head. It is intended that the specification and examples be considered as exemplary only, with a true scope being indicated by the following claims and their equivalents.

What is claimed is:

1. A print head for an additive manufacturing system, comprising:
a housing;
a wetting module mounted to the housing and configured to wet a reinforcement with a liquid matrix and discharge the wetted reinforcement to form an object; and
a matrix supply remote from the wetting module and configured to hold a quantity of the liquid matrix and to supply the liquid matrix to the wetting module, wherein the matrix supply includes:
a cartridge having a base end and a discharge end; and
a cap closing off the base end and moveable towards the discharge end to push liquid matrix from the cartridge out through the discharge end towards the wetting module.

2. The print head of claim 1, wherein the matrix supply further includes:
a vessel configured to hold the cartridge; and
a retainer that retains the cartridge inside the vessel.

3. A print head for an additive manufacturing system, comprising:
a housing;
a wetting module mounted to the housing and configured to wet a reinforcement with a liquid matrix and discharge the wetted reinforcement to form an object; and
a matrix supply remote from the wetting module and configured to hold a quantity of the liquid matrix and to supply the liquid matrix to the wetting module, wherein the matrix supply includes:
a cartridge having a base end and a discharge end; and
a cap closing off the base end and moveable towards the discharge end to push liquid matrix from the cartridge out through the discharge end towards the wetting module; and
further including a sensor configured to generate a signal indicative of a position of the cap within the cartridge.

4. The print head of claim 3, wherein the sensor is located at the base end and configured to generate a beam that reflects off the cap.

5. The print head of claim 3, wherein:
the cartridge is replaceably connected to the matrix supply; and the sensor is mounted to the housing.

6. The print head of claim 3, wherein:
the cartridge is replaceably mounted to the matrix supply; and
the matrix supply includes an actuator mounted to the housing and configured to exert a pressure on the cap.

7. A print head for an additive manufacturing system, comprising:
a housing connectable to a moving support that moves the print head during manufacturing;
a wetting module mounted to the housing and configured to wet a reinforcement with a liquid matrix;
a reinforcement supply module mounted to the housing and configured to direct the reinforcement to the wetting module;
a matrix supply mounted to the housing and configured to direct the liquid matrix to the wetting module; and
at least one sensor configured to generate at least one signal used to activate at least one of the reinforcement supply module and the matrix supply module, wherein the at least one sensor includes a pressure sensor associated with the wetting module; and the at least one signal generated by the pressure sensor is used to activate the matrix supply module.

8. The print head of claim 7, wherein:

the print head further includes a rotary sensor associated with a tensioning module located between the reinforcement supply module and the wetting module; and the rotary sensor is configured to generate a signal used to activate the reinforcement supply module.

9. A print head for an additive manufacturing system, comprising:

a housing;

a wetting module mounted to the housing and configured to wet a reinforcement with a liquid matrix and to discharge the wetted reinforcement to form an object; and a matrix supply remote from the wetting module and configured to hold a quantity of the liquid matrix and to supply the liquid matrix to the wetting module, wherein the matrix supply is pneumatically actuated.

* * * * *